United States Patent
Yoon

(10) Patent No.: US 12,448,150 B2
(45) Date of Patent: Oct. 21, 2025

(54) TERMINAL TRANSPORT VEHICLE

(71) Applicant: AIRPORT TERMINAL MANAGEMENT, INC., Inglewood, CA (US)

(72) Inventor: Jake Yoon, Inglewood, CA (US)

(73) Assignee: Airport Terminal Management, Inc., Inglewood, CA (US)

( * ) Notice: Subject to any disclaimer, the term of this patent is extended or adjusted under 35 U.S.C. 154(b) by 453 days.

(21) Appl. No.: 17/940,392

(22) Filed: Sep. 8, 2022

(65) Prior Publication Data
US 2023/0075541 A1 Mar. 9, 2023

Related U.S. Application Data

(60) Provisional application No. 63/242,451, filed on Sep. 9, 2021.

(51) Int. Cl.
  *B64F 1/31* (2006.01)
  *B60R 21/0136* (2006.01)
  *B60K 1/04* (2019.01)
  *B60R 21/00* (2006.01)

(52) U.S. Cl.
  CPC ............ *B64F 1/31* (2013.01); *B60R 21/0136* (2013.01); *B60K 2001/0405* (2013.01); *B60R 2021/0004* (2013.01); *B60R 2021/0006* (2013.01)

(58) Field of Classification Search
  CPC .................................. B64F 1/31; B62D 51/02
  See application file for complete search history.

(56) References Cited

U.S. PATENT DOCUMENTS

| | | | | |
|---|---|---|---|---|
| 5,205,697 | A * | 4/1993 | Getty ..................... | B64F 1/31 |
| | | | | 414/921 |
| 10,160,349 | B2 * | 12/2018 | Larouche ................ | B60R 9/06 |
| 2019/0225115 | A1 * | 7/2019 | Larouche ............... | B60K 26/02 |
| 2020/0017051 | A1 * | 1/2020 | Erlacher ................. | B60N 2/01 |
| 2021/0078476 | A1 * | 3/2021 | Pailler .................... | B60N 3/004 |
| 2023/0075541 | A1 * | 3/2023 | Yoon ................... | B60R 21/0136 |
| 2024/0181864 | A1 * | 6/2024 | Hidaka .................. | B62D 25/04 |

FOREIGN PATENT DOCUMENTS

| | | | | |
|---|---|---|---|---|
| CN | 2463313 | Y * | 12/2001 | |
| DE | 102016113473 | A1 * | 1/2018 | .......... B62B 3/0612 |
| DE | 102018128099 | A1 * | 6/2019 | .............. B62B 3/00 |
| DE | 202019102868 | U1 * | 8/2019 | |
| DE | 102022202457 | A1 * | 9/2023 | |
| EP | 2050652 | A1 * | 4/2009 | .............. B62B 5/06 |

(Continued)

*Primary Examiner* — Nicole T Verley
(74) *Attorney, Agent, or Firm* — Lewis Brisbois Bisgaard & Smith LLP

(57) ABSTRACT

A transport vehicle for transporting at least four passengers through an airport has a body. A front passenger seat is disposed in the body and is dimensioned to seat two adults thereon. A rear passenger seat disposed in the body and is dimensioned to seat two adults thereon. An operator area, for supporting an operator of the vehicle is disposed on the body. The rear passenger seat is disposed between the front passenger seat and the operator area. A distance from a front of the body to a rear of the operator area is less than a depth of an airport elevator, and a width of the body is less than a width of an airport elevator door.

13 Claims, 20 Drawing Sheets

(56) References Cited

FOREIGN PATENT DOCUMENTS

| EP | 2384951 A2 | * | 11/2011 | ............. B62B 5/063 |
| EP | 3597484 A1 | * | 1/2020 | ............... B60N 2/01 |
| FR | 3050929 A1 | * | 11/2017 | ............... A61G 5/04 |
| IT | 201900000909 A1 | * | 7/2020 | |
| JP | 2019181988 A | * | 10/2019 | |
| SE | 1430082 A1 | * | 12/2015 | |
| WO | WO-2012141591 A1 | * | 10/2012 | ............... B60K 1/00 |
| WO | WO-2016033689 A1 | * | 3/2016 | ............ B60N 2/005 |
| WO | WO-2018058251 A1 | * | 4/2018 | ............... B60K 1/00 |

* cited by examiner

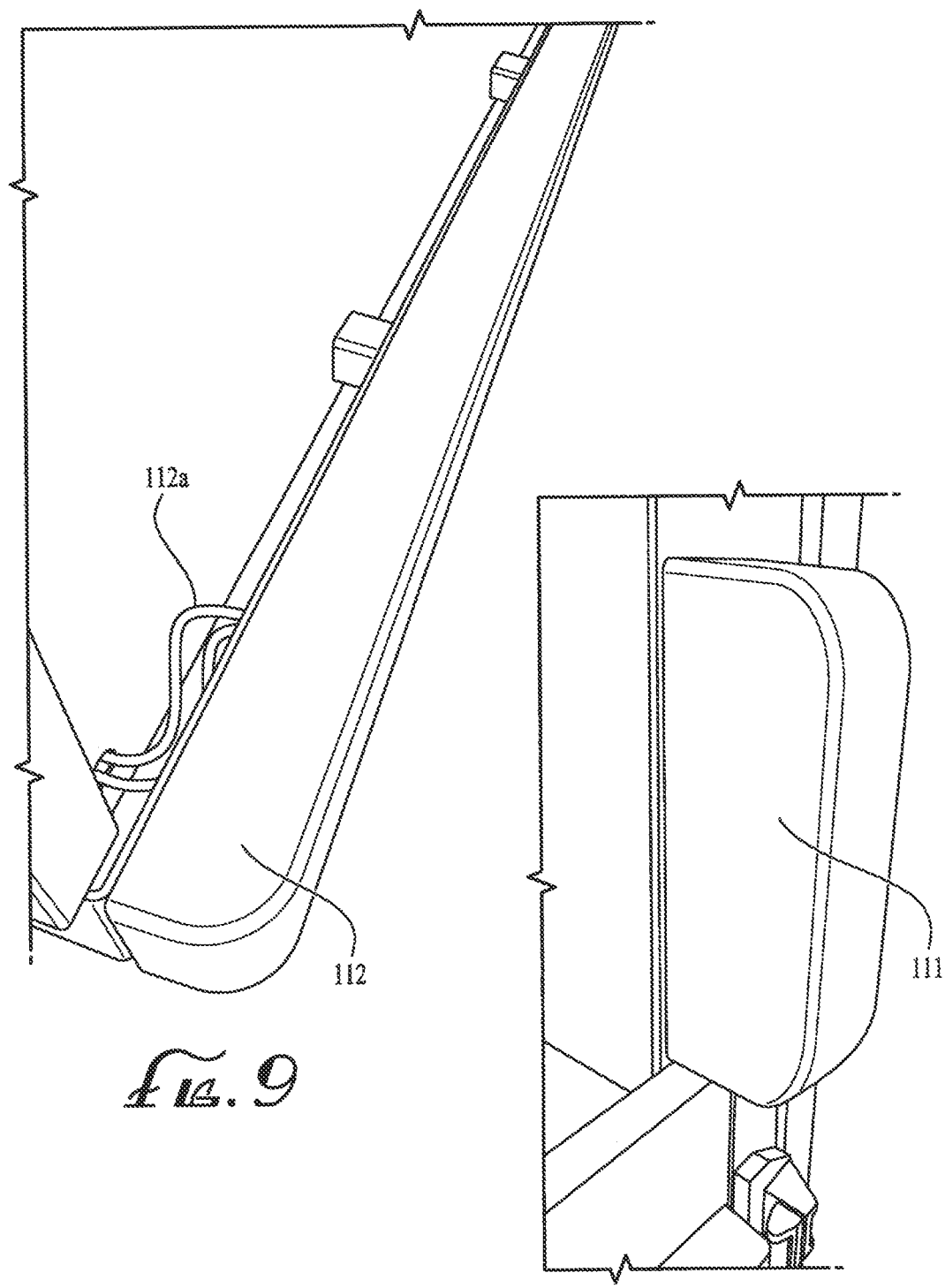

TERMINAL TRANSPORT VEHICLE

CROSS-REFERENCE TO RELATED APPLICATION

This application claims the benefit of U.S. Provisional Patent Application Ser. No. 63/242,451 filed Sep. 9, 2021, the entirety of which is incorporated by reference herein as if fully set forth.

FIELD OF INVENTION

The present invention is in the field of transport vehicles, more particularly, for use in airport terminals.

BACKGROUND

Millions of people travel through airports each year. Airport terminals are a thoroughfare for all types of individuals, including babies, individuals with special needs, the elderly, and the disabled. When a passenger with a disability requests assistance from an airline to move through the airport, U.S. Department of Transportation regulations require the airline to promptly provide the requested assistance. This assistance may be guide assistance for an individual who is blind or wheelchair assistance for an individual with a mobility impairment. Assistance is required to be provided to passengers with a disability as they navigate through different portions of the airport. This includes assisting the individual from the terminal entrance (or vehicle drop-off point in the departure area) to the gate location where the flight is departing, including the security checkpoint, and onto the aircraft seat; assisting the individual from the aircraft seat on an arriving flight through the airport to the gate location of any connecting flight; assisting the individual from the gate location of the connecting flight to the aircraft seat; and assisting the passenger from the aircraft seat on an arriving flight through the airport to the baggage claim area, terminal entrance, or in the arrivals area or designated vehicle pick-up location. While wheelchairs are commonplace in assisting the elderly and disabled at airport terminals, including in key function areas such as assisting the passenger from the aircraft seat, to the ticket counters and baggage claim, there is a need for an improved and efficient way to assist a plurality of arriving passengers and transport such passengers to and from the gate and through sections of the airport. There is also a need for providing a mode to transport passengers in a safer way, using a vehicle with improved safety features.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

A transport vehicle is described herein. The transport vehicle comprises seats to accommodate several individual passengers, a chargeable battery such as a lithium iron phosphate battery, a controller, an onboard charger, an LED (or LCD) screen control unit, an onboard battery control management system, and a handle with a drive acceleration lever and a handgrip for vehicle steering, and a collapsible foot board for the operator. The vehicle may further comprise a plurality of doors and a foldable tray for one or more passengers. The doors may comprise a locking mechanism to keep the door closed. The vehicle may further comprise partition windows separating the passengers, and may further comprise a camera, one or more collision sensors, and one or more raised flashers or lights. The vehicle may be configured to fit through and fully occupy airport elevators, particularly the terminal or gate elevators. The vehicle may also be configured with different speed modes, such as a slow or "turtle" mode and an emergency stop button.

These and other embodiments, features, aspects, and advantages of the invention will become better understood with regard to the following description, appended claims and accompanying drawings.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative. The foregoing aspects and the attendant advantages of the present invention will become more readily appreciated by reference to the following detailed description, when taken in conjunction with the following accompanying drawings:

FIG. 9 shows a perspective view of a padded collision sensor on a front section of a transport vehicle, according to an aspect of this disclosure;

FIG. 10 shows a perspective view of a padded collision sensor on a side section of a transport vehicle, according to an aspect of this disclosure;

Figure 1:
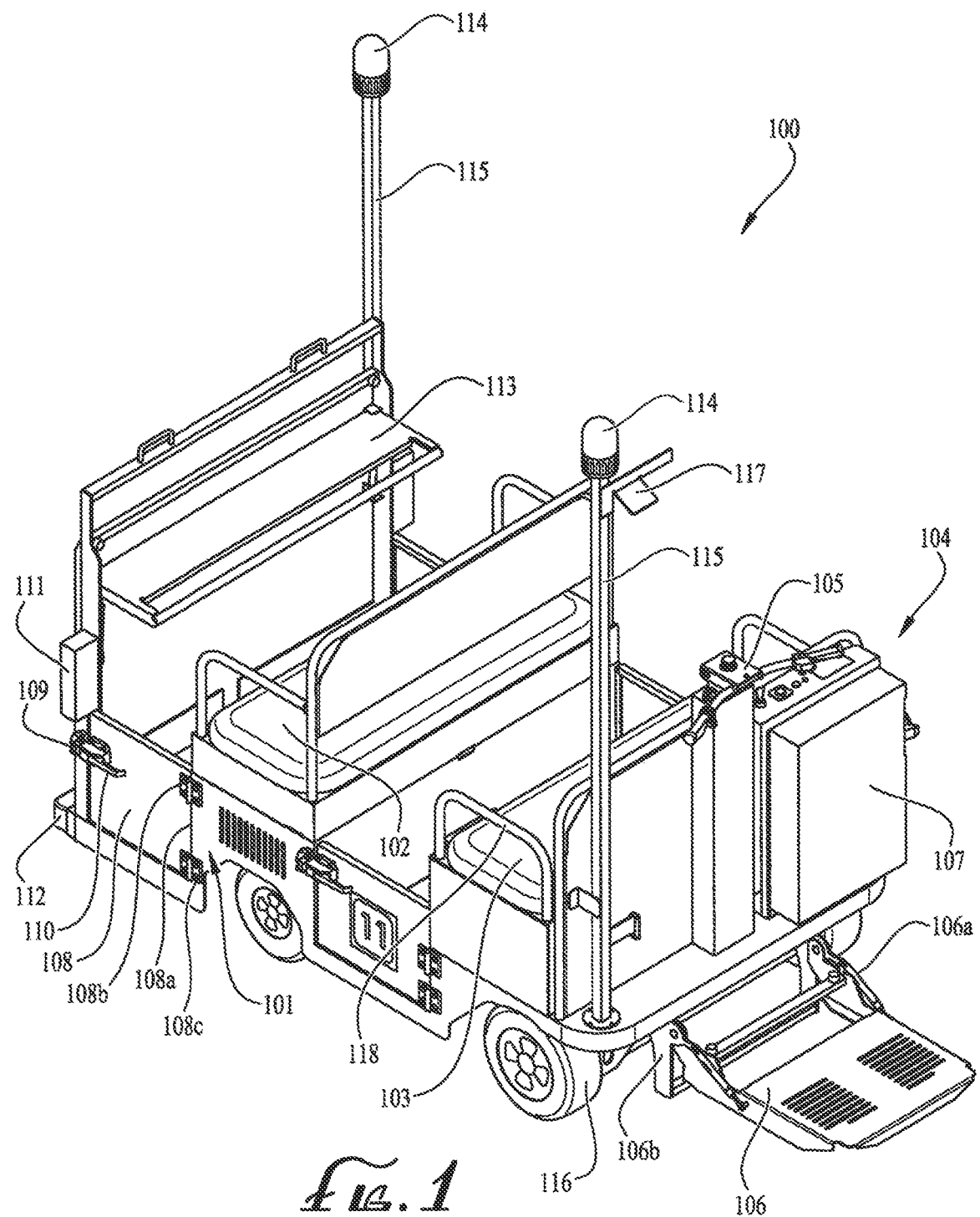
FIG. 1 shows a perspective view of a transport vehicle, according to an aspect of this disclosure.

Reference symbols or names are used in the figures to indicate certain components, aspects or features shown therein. Reference symbols common to more than one figure indicate like components, aspects or features shown therein.

DETAILED DESCRIPTION

Reference now will be made in detail to embodiments of the invention, one or more of which are illustrated in the drawings. Each embodiment is provided by way of explanation of the invention, not limitation of the invention. It will be apparent to those skilled in the art that various modifications and variations can be made to the present embodiments without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the airport industry, safe and efficient means of transporting passengers through various sections or areas of the airport is an important aspect. Thus, it is important to have a transport vehicle that has features that improve safety and efficiency. It should be appreciated that, although the vehicle and its embodiments are primarily described herein are with reference to airport terminal transport vehicles, they may generally be utilized in other applications where such vehicles may be used. For example, the disclosed transport vehicles and their features may be incorporated into other applications which require passenger transportation, such as bus stations, car rentals, parking lots, malls, and theme parks.

Figure 2:
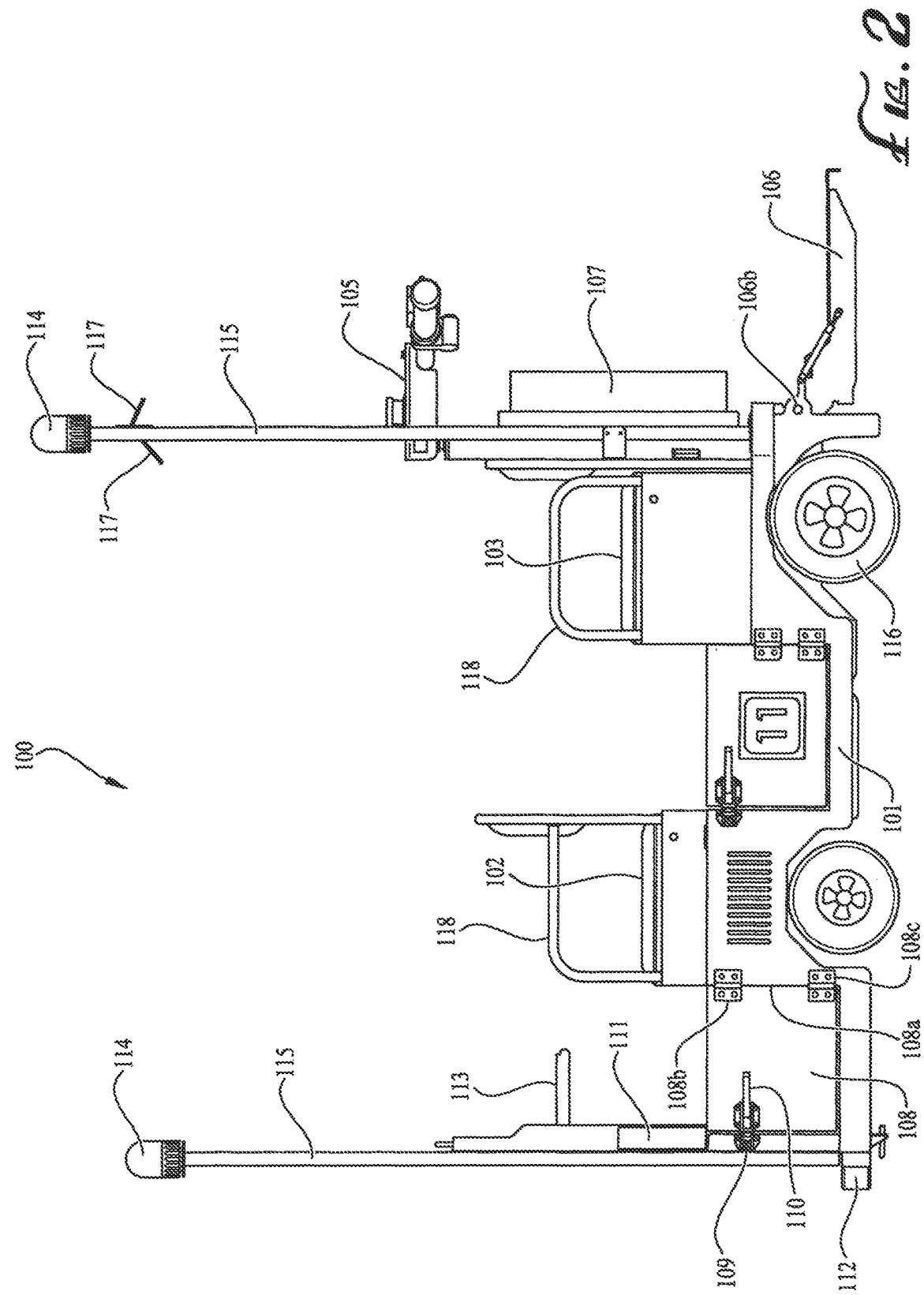
FIG. 2 shows a side view of a transport vehicle, according to an aspect of this disclosure.
Figure 3:
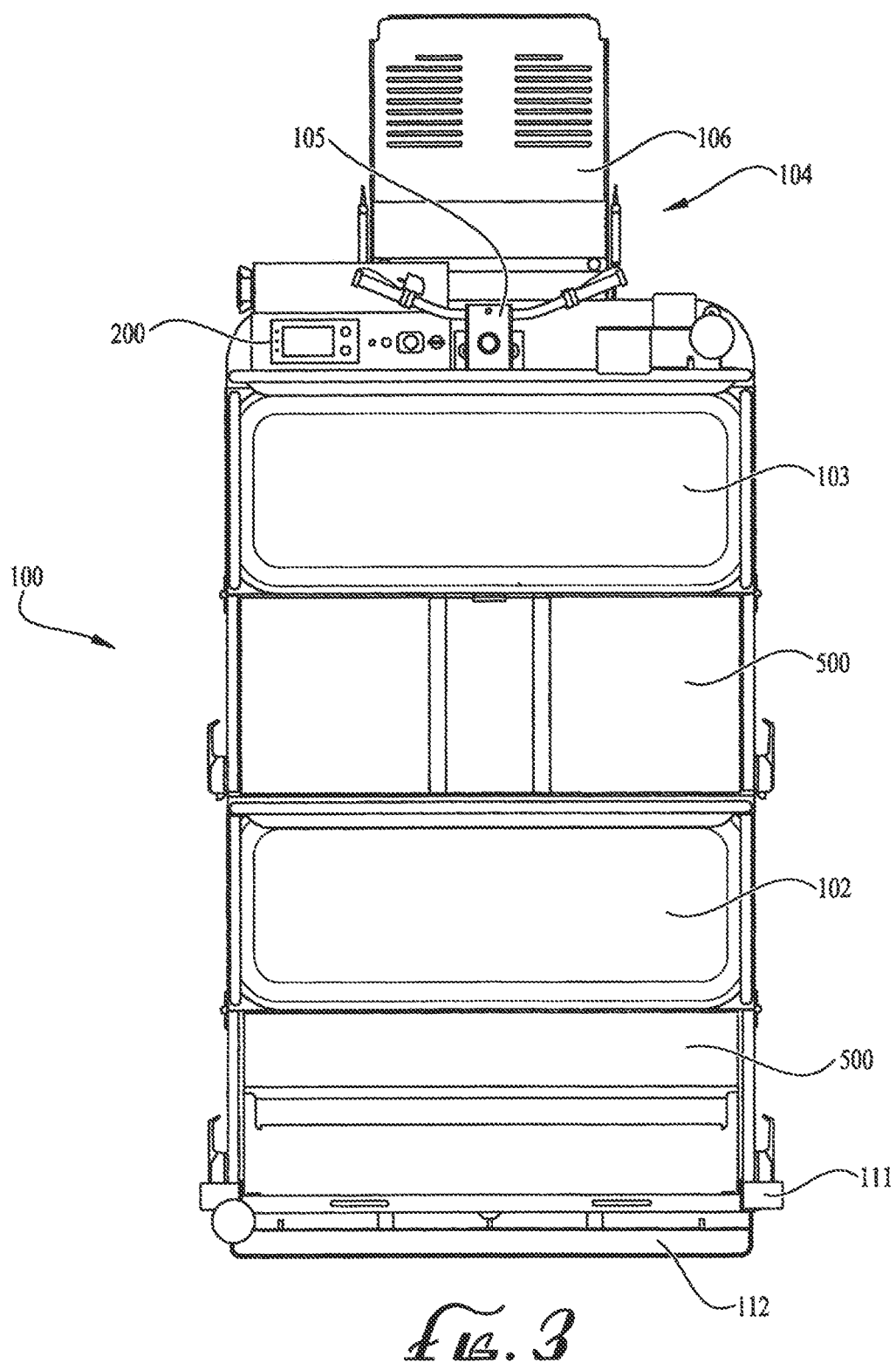
FIG. 3 shows a top view of a transport vehicle, according to an aspect of this disclosure.

FIGS. 1, 2 and 3 show a transport vehicle 100. The transport vehicle 100 may comprise a body 101, a front passenger seat 102, a rear passenger seat 103, and a rear-disposed operator area 104 comprising a steering handle 105, a collapsible foot board 106, and a controller box 107. The collapsible foot board 106 may be connected to the vehicle body through hinges 106a, 106b. In an embodiment, the vehicle may comprise a plurality of doors 108 that have a locking mechanism 109 with a lever 110, to keep the door in a closed position as shown in FIG. 1. The hinged end 108a of the door 108 is pivotally-connected to the body by at least one hinge 108b, 108c. The vehicle 100 may also comprise a side collision sensor 111 and a front collision sensor 112. These collision sensors may be padded or foam-filled, and manufactured using rubber, plastic, or other polymer or shock absorbing material. The vehicle 100 may also comprise a foldable tray 113 located in the front passenger area, though a tray may also be placed in front of the rear passenger area, behind the back rest of the front passenger seat (not shown). The vehicle 100 may also comprise a light 114 at the end of a pole 115 that is attached or welded to the vehicle. The light 114 may be an LED light, or any other similar light that may be configured to be flashing, or function similarly to a rotating beacon, or may be of a single uniform color, or of different colors and configurations. The vehicle also has four wheels 116, two on each side of the vehicle, and the wheels may be air or foam filled. The vehicle may also have a camera plate 117 attached to a pole 115 or at another raised location on the vehicle 100 (not shown). The camera plate 117 which may attach or comprise a front camera, a rear camera, or perspective or panoramic camera, or a 360 degree camera. There may be more than one cameras attached to the camera plate 117, and there may be more than one camera plates. The vehicle's front passenger seat 102 and rear passenger seat 103 may have arms 118 that may be of a tubular structure, or similar structure such as a railing (not shown) or barrier that may protect the passenger from sliding off or falling off to the side of the vehicle during operation. The vehicle seats may also have passenger seat belts, one for each passenger. The vehicle 100 may be made from aluminum, steel, stainless steel, alloy, or any other material one skilled in the art would use to construct such a vehicle 100.

Figure 4:
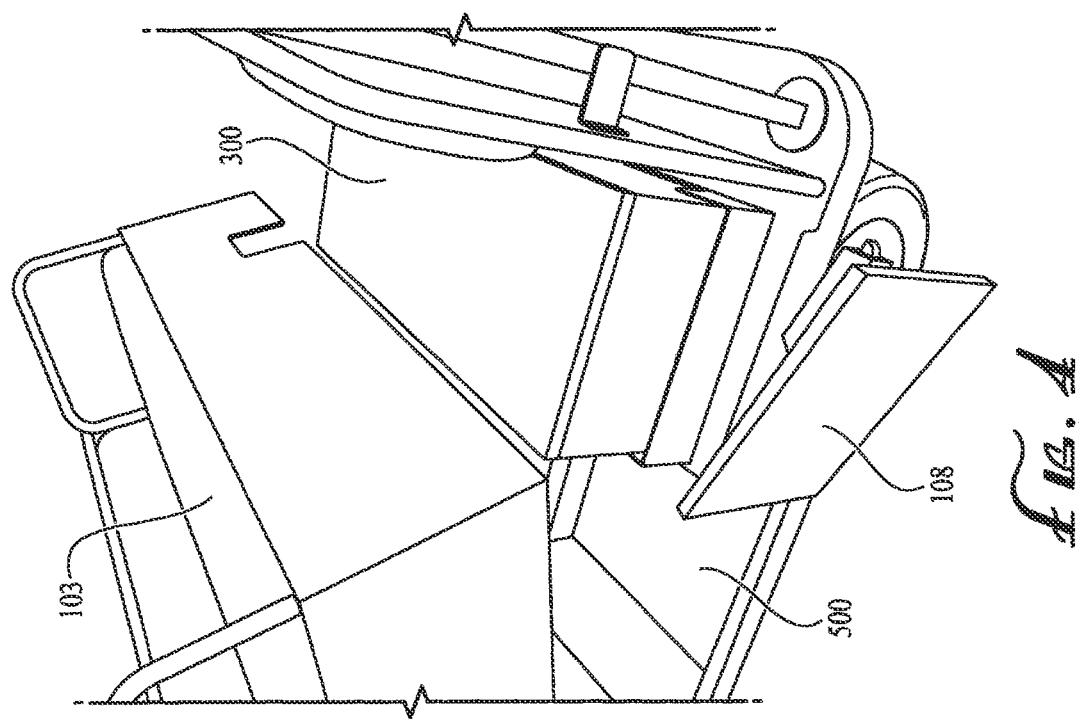
FIG. 4 shows a perspective view of a rear seat of a transport vehicle, where a battery is stored, according to an aspect of this disclosure.

As shown in FIG. 3, which is the top view of the vehicle 100, it has floors 500 on which passengers may rest their feet. The vehicle 100 also has a screen control unit 200 which may be located at the rear-disposed operator area 104. FIG. 4 shows a battery 300 that is located underneath the rear passenger seat 103.

Figure 5:
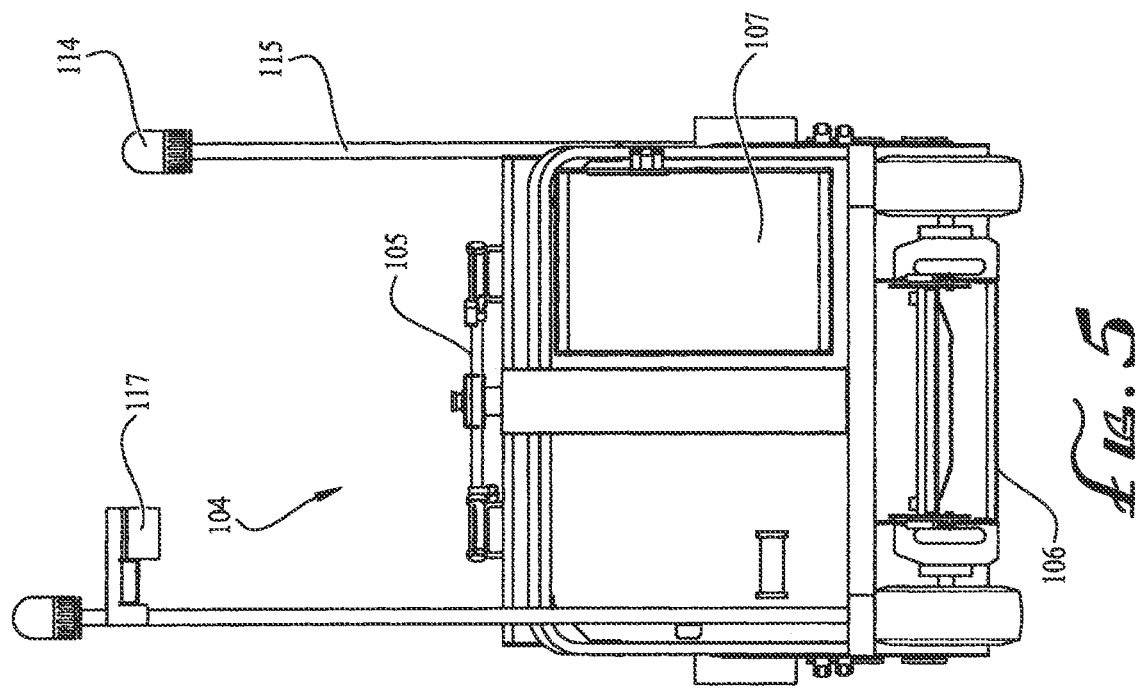
FIG. 5 shows a rear view of a transport vehicle, according to an aspect of this disclosure.

As shown in FIG. 5, the rear-disposed area 104 has a steering handle 105 and a collapsible foot board 106, and a controller box 107 that contains the controller (not shown). The controller may comprise any suitable computer and/or other processing unit, including any suitable combination of processing units, which may be communicatively coupled to one another (e.g., the controller may form all or part of a controller network), so long as the controller(s) function(s) to accomplish the intended purposes as described herein. The controller as described herein can be made by one of ordinary skill in the art without undue experimentation. The steering handle 105, the motor, and the battery 300 are communicatively connected to the controller. The controller may also be communicatively connected to the battery management system.

Figure 6:
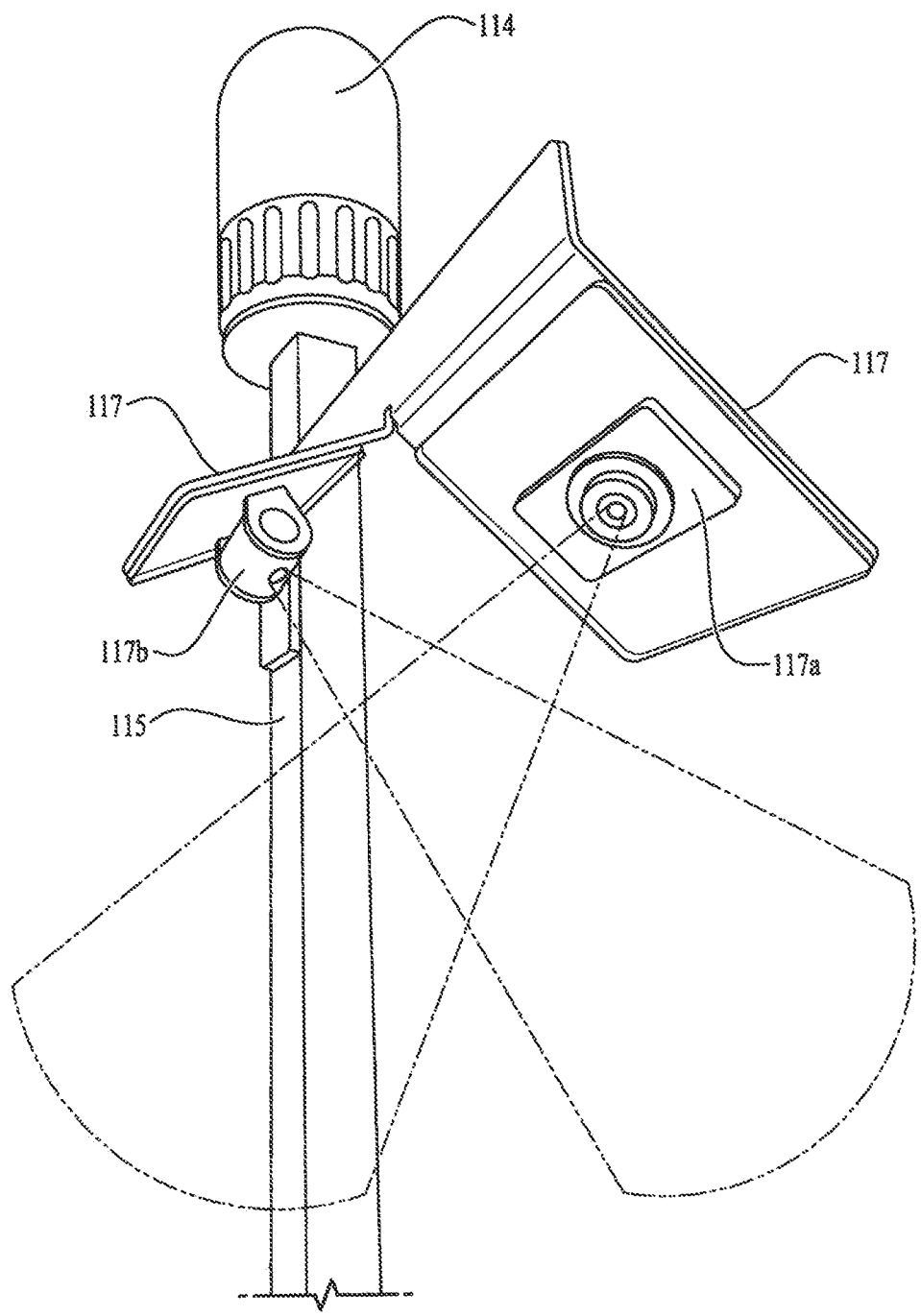
FIG. 6 shows a perspective view of a camera set up of a transport vehicle, according to an aspect of this disclosure.

FIG. 6 shows two camera plates 117 with cameras 117*a*, 117*b* attached to the plates. The camera plate 117 may be attached to the pole 115 by way of screws, welding, or by any method to securely attach the plate to the pole, in a manner that would accommodate the weight of one or more plates and one or more cameras. The camera may be of varying configurations, such as wide-angle, rotatable, and may have a single lens or multiple lenses. The camera may record the operator or the rear-disposed operator area 104 and/or the area where passengers sit. The camera may also record the surrounding environment of the vehicle during operation, or before and after operation. The camera may record footage, and may use physical media such as an SD card, or may be network-connected or cloud-based to store said footage. It may also have wireless capabilities that may be accessed through a computer or smart phone. The camera used and mounted or attached to the camera plate 117 may be any commercially available camera so long as they function to accomplish the intended purpose of being able to provide images and/or record images and/or footage surrounding the camera, such as the rear-disposed operator area, the operator, the passenger seating area and/or the environment that surrounds the vehicle.

Figure 7:
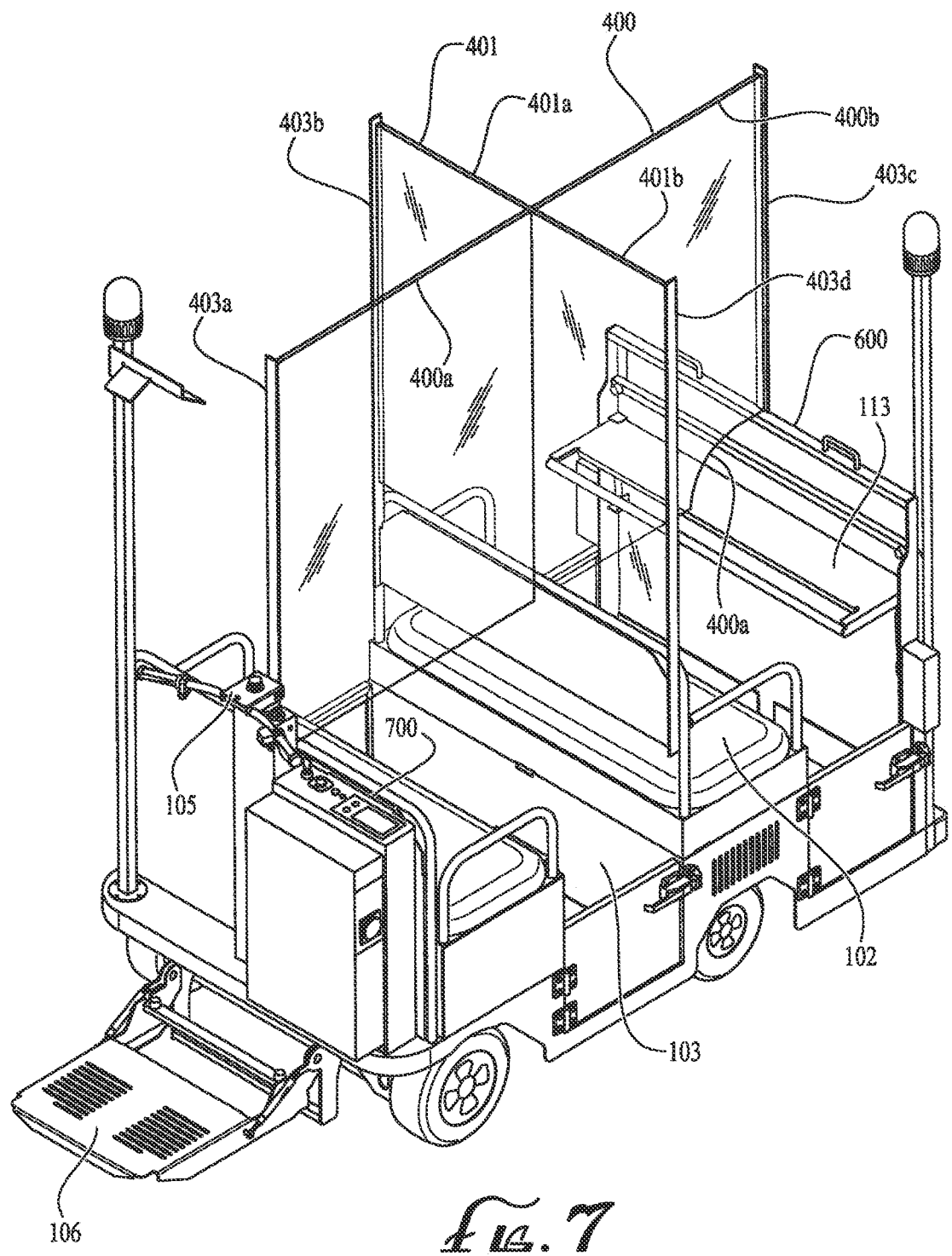
FIG. 7 shows a perspective view of a transport vehicle with partition windows, according to an aspect of this disclosure.

FIG. 7 shows an embodiment of a vehicle 100 with a first partition window 400 that is parallel to a length of a side of the vehicle, or parallel a longitudinal axis of the vehicle, providing a separation between the passengers in the front passenger seat 102, and between the passengers in the rear passenger seat 103. The partition windows facilitate social distancing requirements such as those implemented during or as a result of the COVID-19 pandemic. FIG. 7 also shows a second partition window 401 that is parallel to a lateral axis of the vehicle, providing a separation between passengers in the front passenger seat 102 and the rear passenger seat 103. The second partition window 401 is perpendicular to first partition window 402. The front partition window 400 may have a cut-out portion 400*a*, to accommodate the opening and closing of a front passenger foldable tray 113. The first partition window 400 may comprise two partition windows, 400*a* and 400*b*, and the second partition window 401 may comprise two partition windows, 401*a* and 401*b*. The length of the first partition window 400 may extend the length of the vehicle, from the back portion 700 of the vehicle, behind the rear passenger seat 103, to the front portion 600 of the vehicle. The length of the second partition window 401 may extend the length of the front passenger seat 102. The respective lengths of the partition windows may be varied, depending on the partition or separation desired for each passenger. The first partition window 400 and the second partition window 401 may be attached to metal bars or poles 403*a*, 403*b*, 403*c*, 403*d* extending vertically from the vehicle, and the attachment may be made by known fastening means, such as through bolts, anchors, nuts, pins, screws, joints, rivets, so long as they are sufficient to securely facilitate attachment of the partition windows to the vehicle. The partition windows are preferably transparent, or see-through, and may be made from Poly (methyl methacrylate) (PMMA), also known as acrylic, acrylic glass, perspex, or plexiglass, as well as by the trade names and brands Crylux, Plexiglas, Acrylite, Astariglas, Lucite, Perclax, and Perspex. The partition windows are of sufficient thickness to resist buckling or perforation (typical thickness of such materials range from ⅛", 3/16", ¼", ⅜", ¼", ½", 1", 1.25", 1.5", 2", 2.5").

Figure 8:
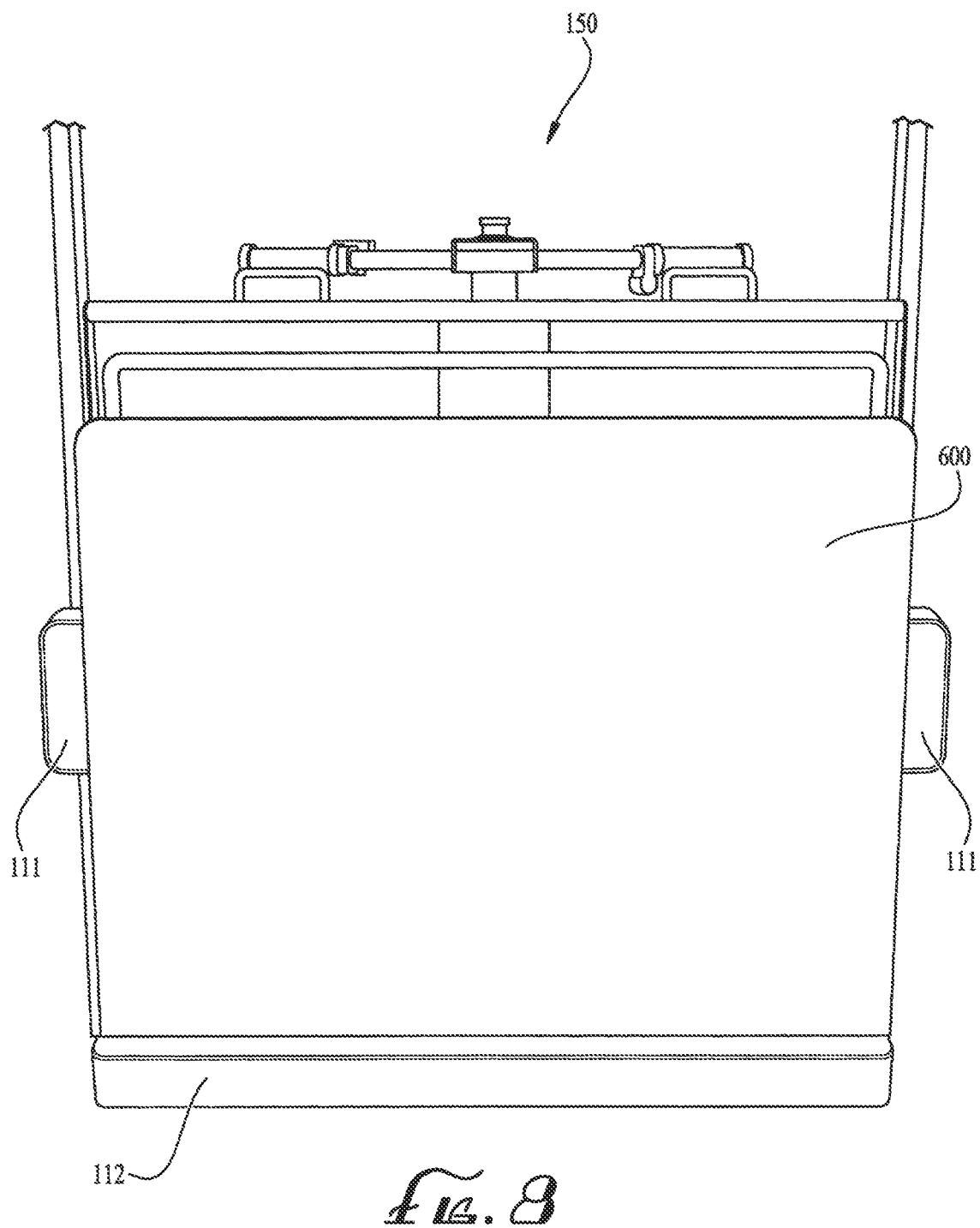
FIG. 8 shows a front view of a transport vehicle, according to an aspect of this disclosure.

FIG. 8 shows a front view of an embodiment of the vehicle 150, with a front collision sensor 112 and a side collision sensor 111 on either side of the vehicle. The collision sensors may be made of a padded material or foam-filled, or any suitable shock-absorbing material. The front collision sensor 112 may extend the horizontal length of the front portion of the vehicle 600, or a substantial length thereof, and the side collision sensor 112 may extend the vertical length of the front portion of the vehicle 600, or a portion thereof as shown in FIG. 8.

As shown in FIGS. 9 and 10, the collision sensors may be shaped to have curved edges. The sensor is operatively connected to the vehicle controller through a connector 112*a*. When impact occurs, or pressure is applied to the collision sensor, a signal is generated which is sent to the controller which then activates the emergency braking system of the vehicle. The requisite amount or degree of pressure applied to the collision sensor to activate the emergency braking system is such that the occurrence of unintended or unnecessary braking is reduced or minimized. The goal is to activate the emergency braking only when there is sufficient pressure or impact applied to the sensor, such as when the vehicle is in operation, in normal speed, and makes contact with a person's leg or body part, a wall, or an obstruction. The goal is to reduce the likelihood of injury not only to the passenger(s) or operator of the vehicle but also, to a person outside of the vehicle when impact occurs, and to reduce the likelihood of damage to surrounding walls or items and objects when impact occurs during vehicle operation. The sensor is communicatively connected to a controller and may be sourced from suppliers that manufacture sensors that function to accomplish the intended purposes as stated herein, or any other purpose to facilitate safety.

Figure 12:
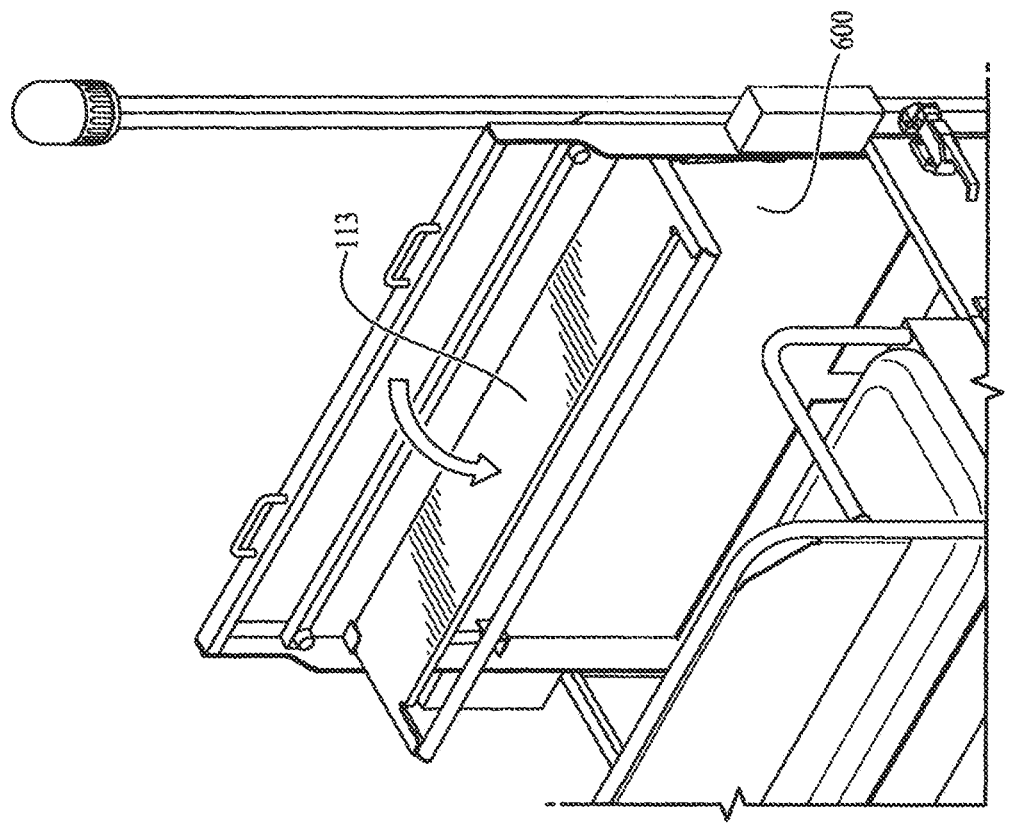
FIG. 12 shows a perspective view of a transport vehicle according to an aspect of this disclosure, with a foldable tray in its open position.
Figure 11:
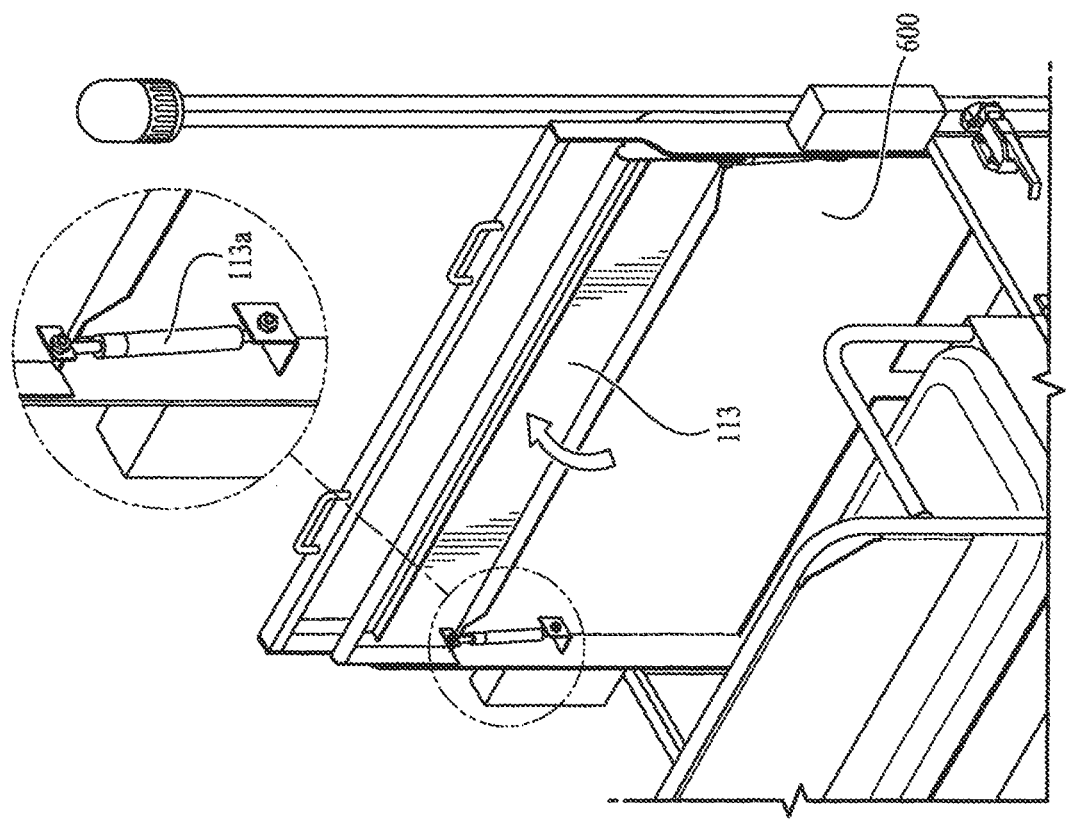
FIG. 11 shows a perspective view of a transport vehicle according to an aspect of this disclosure, with a foldable tray in its upright or closed position, and an enlarged view of a gas spring of the foldable tray.

As shown in FIGS. 11 and 12, an embodiment of a vehicle may have a foldable tray 113 that may be pushed upright or into its closed position as shown in FIG. 11, and pushed down to its open, in-use position as shown in FIG. 12. The movement of the foldable tray 113 to and from its closed position, and to and from its open or in-use position may be facilitated by a hinge, such as a gas spring hinge 113*a* that may have soft close or soft open features, and which supports the tray 113 to keep it in its upright position as shown in FIG. 11, until it is pushed down into its open position as shown in FIG. 12. The hinge 113*a* may be fastened, such as by bolt, screw, or other known fastening mechanisms, to the bottom of the tray and to a flange attached to, or extending from behind the front portion 600 of the vehicle, or from an area thereof or to a reinforcement of the front portion, so long as it sufficient to support the foldable tray 113 in its open and closed positions, and during use.

Figure 13:
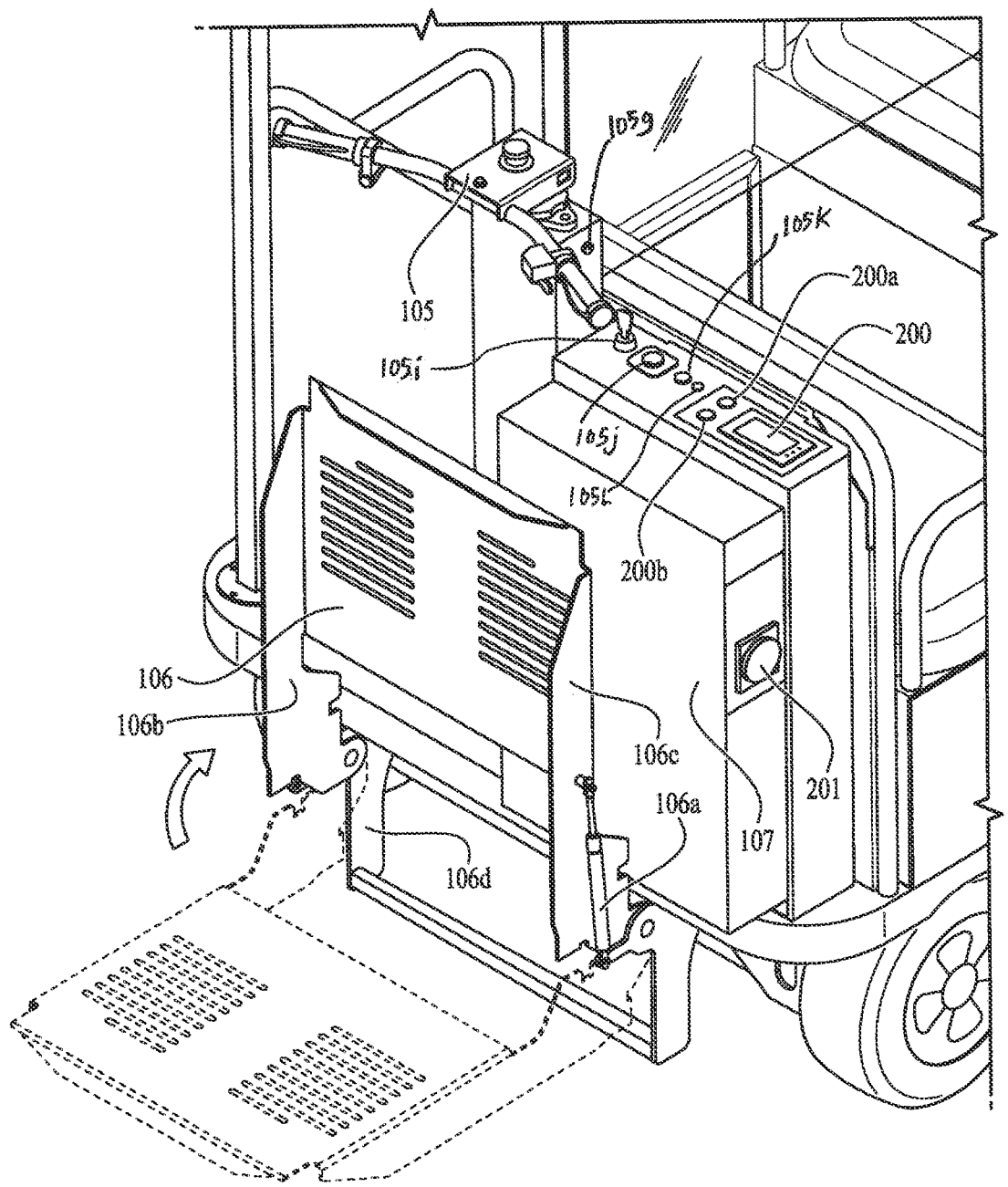
FIG. 13 shows a perspective view of a rear of a transport vehicle with a collapsible foot board, according to an aspect of this disclosure.
Figure 30:
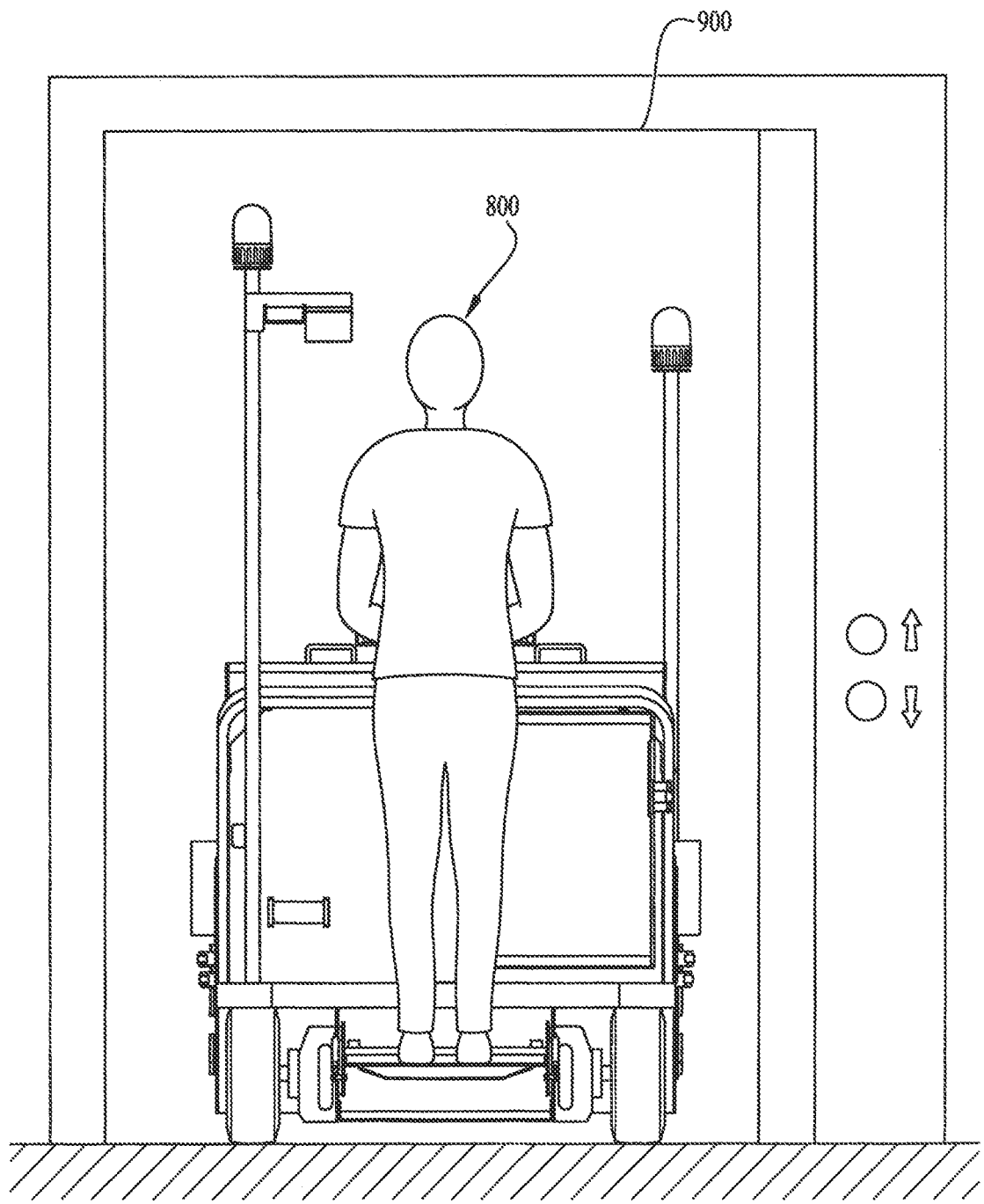
FIG. 30 is a rear view of a transport vehicle while in use, according to an aspect of this disclosure.

FIG. 13 shows a rear perspective view of an embodiment of a vehicle, with a collapsible foot board 106. The collapsible foot board may be made of metal or other materials that would support and withstand the weight of a person operating the vehicle, and may comprise reinforcements 106*b* and 106*c*. The movement of the collapsible foot board 106 to and from its closed position, to and from its open or in-use position may be facilitated by a hinge, such as a gas spring hinge 106*a* that may have soft close or soft open features, and which supports the foot board 106 to keep it in its upright position as shown in FIG. 13, until it is pushed down into its open position as shown in FIG. 1, keeping it in its open position. The hinge 106*a* may be fastened, such as by bolt, screw, or other known fastening mechanisms, to a bracket 106*d* attached to or extending from the bottom of the vehicle, sufficient to support the foot board 106 in its closed position, and the weight of an operator when the foot board 106 is in use. When it is in use, or in its open position, the foot board 106 is raised from the ground with sufficient clearance, as shown in FIG. 30.

FIG. 13 also illustrates a steering handle 105 that is operatively and communicatively connected to the controller (not shown) located within the controller box 107, through circuitry or cable(s) located within a connection tube 105*a*. Also shown in FIG. 13 is a 12V outlet 105*j*, a bumper sensor release button 105*k* which activates or deactivates the bumper or collision sensor of the vehicle. There may also be a back buzzer switch 105*l* which activates an audible sound when the vehicle is backing up. Also shown is a screen control unit 200 that is part of a battery management system of an embodiment of a transport vehicle. The screen control unit 200 may have a switch, or switches, such as a first "on" switch 200*a* and a second "on" switch 200*b*, that may be pressed or pushed by a person or vehicle operator individually, or sequentially, to turn on or power up the screen control unit 200. Also illustrated is the charging socket cover 201 located on the side of a controller box 107.

FIGS. 14 through 24 illustrate the information provided by the screen control unit 200 (which may be an LED screen) that is part of the battery management system in an embodiment of a vehicle. The battery management system is a real-time battery monitoring system that manages a rechargeable battery from operating outside its safe operating area, monitoring its state, calculating data, reporting that data, controlling its environment, authenticating it and/or balancing it. A battery pack built together with a battery management system with an external communication data bus is known as a "smart battery pack." A smart battery pack may be charged with a battery charger as described herein.

An embodiment of a vehicle according to an aspect of this disclosure comprises a rechargeable battery, such as a lithium iron phosphate (LFP) battery. The lithium iron phosphate battery is a type of lithium-ion battery using lithium iron phosphate as the cathode material, and a graphitic carbon electrode with a metallic backing as the anode. The specific capacity of LFP is higher than that of the related lithium cobalt oxide (LiCoO2) chemistry, but its energy density is less due to its lower operating voltage. Because of its low cost, non-toxicity, the natural abundance of iron, its excellent thermal stability, safety characteristics, electrochemical performance, and specific capacity (170 mA·h/g, or 610 C/g) LFP has gained considerable market acceptance and is finding a number of roles in vehicle use, utility scale stationary applications, and backup power. Products are now in mass production and are used in industrial products by major corporations including Black and Decker's DeWalt brand, the Fisker Karma, Daimler AG, Cessna and BAE Systems.

An embodiment of the vehicle is equipped with a chargeable battery and a battery management system, which may be commercially sourced from ZeroNox. While this is the preferred source or manufacturer, other sources that provide similar technology (e.g., chargeable lithium ion or lithium iron phosphate battery which may include a battery management system) may be utilized so long as they function to accomplish the intended purpose described herein.

Lithium iron phosphate (LFP) battery is a feature that improves safety of a passenger transport vehicle utilizing a chargeable battery. For instance, if a fire occurs with an LFP battery, it can be extinguished with an ordinary water sprinkler system. Moreover, lithium iron phosphate has a thermal runaway temperature of approximately 518° F. (270° C.), which is much higher than other lithium battery chemistries. Thus, LFP batteries can deliver rapid discharge and recharge while generating very little heat. They require less ventilation or cooling, and can withstand higher temperatures without decomposing. When exposed to air due to an accident (e.g. piercing of the battery casing), the lithium iron phosphate chemistry will not react with oxygen, and therefore will not cause an explosion or fire.

LFP is very stable because it contains no cobalt, which is known to be a chemically unstable element. The chemistries in lithium cobalt oxide and lithium manganese cobalt batteries generally break down at much lower temperatures and release far more potentially hazardous energy. Cobalt-based lithium batteries generate heat in their normal battery operation, which increases the risk of thermal runaway. There is no known effective fire retardant against a cobalt fire, and the only option is to let the fire burn itself out. However, if a fire occurs with an LFP battery, it can be extinguished by an ordinary water sprinkler system.

Also, the battery management system in LFP batteries allows monitoring of internal battery temperature. This gives full control of charging and discharging, protecting from overcharging and overheating, and preventing unsafe temperatures inside the lithium-ion cells. Additionally, lithium iron phosphate batteries usually have a durable battery design and cell packaging, manufactured to comply with national safety standards.

Thus, manufacturers across industries turn to lithium iron phosphate for applications where safety is a factor. Lithium iron phosphate has excellent thermal and chemical stability. This battery stays cool in higher temperatures. It is also incombustible when it is mishandled during rapid charges and discharges or when there are short circuit issues. Lithium iron phosphate does not normally experience thermal runaway, as the phosphate cathode will not burn or explode during overcharging or overheating as the battery remains cool.

Of all the lithium options available, there are several reasons why LFP has generally been selected as the ideal lithium technology for replacement of sealed lead acid (SLA) batteries. The main reasons include: Similar voltage to SLA (3.2V per cell×4=12.8V) making them ideal for SLA replacement; safest known form of the lithium technologies; environmentally friendly, as phosphate is not hazardous and is thus an environmentally-friendly alternative and has no known health risks; LFP batteries have a wide temperature range; LFP batteries are less than half the weight of SLA, thus, resulting in reduction in overall weight, and increase in fuel efficiency and speed; LFP batteries also have a longer runtime of up to 6 times the cycle life of SLA, LFP batteries have a lower total cost of ownership (cost per kWh much lower over life of battery for LFP), and resulting reduction in replacement costs; flat discharge curve yields more efficient use of battery capacity; LFP batteries have a greater charge efficiency so that the battery is charged and is ready to be used again more quickly compared to SLA batteries.

Moreover, LFP batteries have a greater advantage over other lithium iron batteries. LFP chemistry offers a longer cycle life than other lithium iron batteries. LFP batteries have a very constant discharge voltage, in that voltage stays close to 3.2 V during discharge until the cell is exhausted. This allows the cell to deliver virtually full power until it is discharged, and it can greatly simplify or even eliminate the need for voltage regulation circuitry. Because of the nominal 3.2 V output, four cells can be placed in series for a nominal voltage of 12.8 V. This comes close to the nominal voltage of six-cell lead-acid batteries. Along with the improved and advantageous safety characteristics of LFP batteries, this makes LFP a good potential replacement for lead-acid batteries in applications such as automotive and solar applications. Additionally, the use of phosphates avoids cobalt's cost and environmental concerns, particularly concerns about cobalt entering the environment through improper disposal. LFP has higher current or peak-power ratings and LFP cells experience a slower rate of capacity loss (also known as greater calendar-life) than other lithium-ion batteries due to LFP's slower decline of energy density. Compared to other lithium chemistries, LFP experiences much slower degradation when stored in a fully charged state. Thus, this makes LFP a good choice for standby use.

The battery management system of an embodiment of a vehicle as disclosed herein has monitoring and control functions, and a single module is capable of monitoring up to 24 series of batteries, configured from the control module maximum support extended monitoring 60 series of cores. It may also have the capability of providing real time monitoring, fault diagnosis, state of charge (SOC) estimation, charge and discharge control and protection, battery pack equalization, temperature control and other functions of power battery parameters of electric vehicles, and exchange information with vehicle integrated controller or charger by CAN bus to ensure efficient, reliable and safe operation.

As an added safety mechanism, the battery management system may also monitor one or more of the following: loose connection, fault diagnosis of temperature sensors, current detection, fault management and diagnosis; circuit status; and external vibration.

The LFP battery in an embodiment of a vehicle disclosed herein may comprise LFP 3.2V 80 Ah cells which power the vehicle with a total capacity of 51.2V 160 Ah. The vehicle is equipped with an onboard charger (OBC) (in conjunction with the charger 202 depicted in FIGS. 26 and 27) to charge the LFP battery 300, which as shown in FIG. 4, may be located underneath the rear passenger seat 103. The OBC may use a 110 VAC input voltage with an input current less than or equal to 16 A. The charging current is about 14.5 A. The charging time is about 9-10 hours with a state of charge (SOC) from 15% to 100%. The run time is approximately 8-10 hours on a full charge, with 4 passengers and 1 operator or driver.

An embodiment of a vehicle with the battery management system disclosed herein comprises a battery that may be charged using any standard 110V (or 120V) outlet as long as the circuit breaker is able to accommodate 15-16 A of draw from the power supply. The OBC is communicatively connected with the battery management system such that it will stop charging automatically when the battery reaches 100% or substantially close to 100%.

Figure 14:
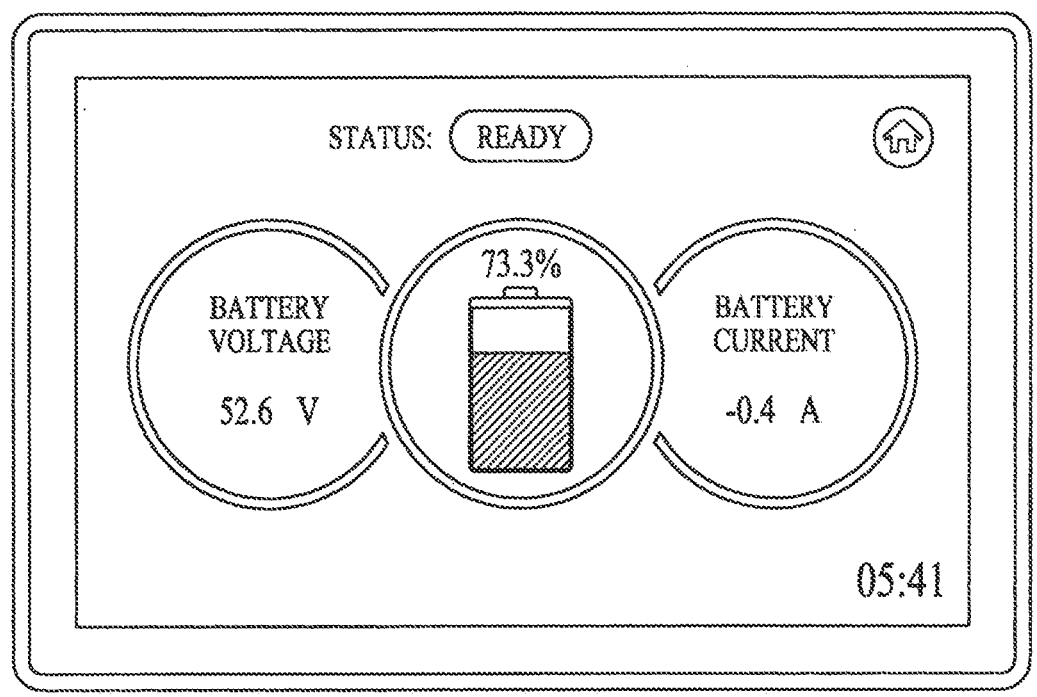
FIG. 14 shows a diagram of a screen of a battery management system of a transport vehicle, according to an aspect of this disclosure.

As shown in FIG. 14, an embodiment of the screen control unit 200 (which may be LED touchscreen) may provide information regarding the battery, such as voltage, the battery charge percentage, and battery current.

Figure 15:
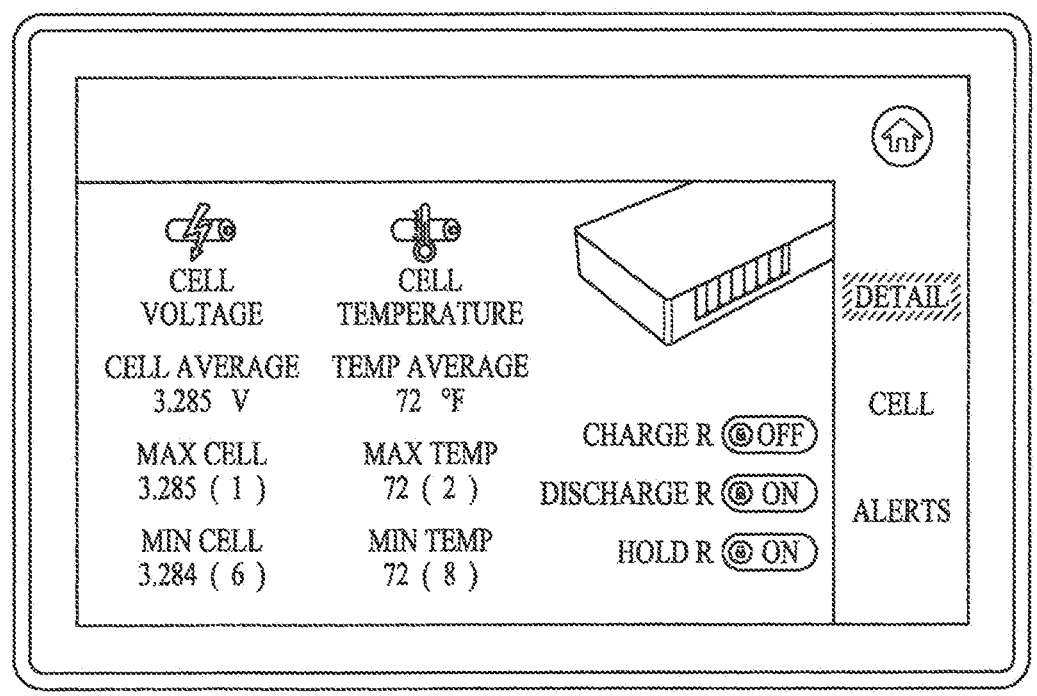
FIG. 15 shows a diagram of a screen of a battery management system of a transport vehicle, according to an aspect of this disclosure.

As shown in FIG. 15, an embodiment of the screen control unit 200 may also provide information regarding cell voltage and cell temperature, including details regarding the cell voltage such as the average cell voltage, the maximum cell voltage, and the minimum cell voltage, and including details regarding the cell temperature such as the average cell temperature, the maximum cell temperature, and the minimum cell temperature.

Figure 16:
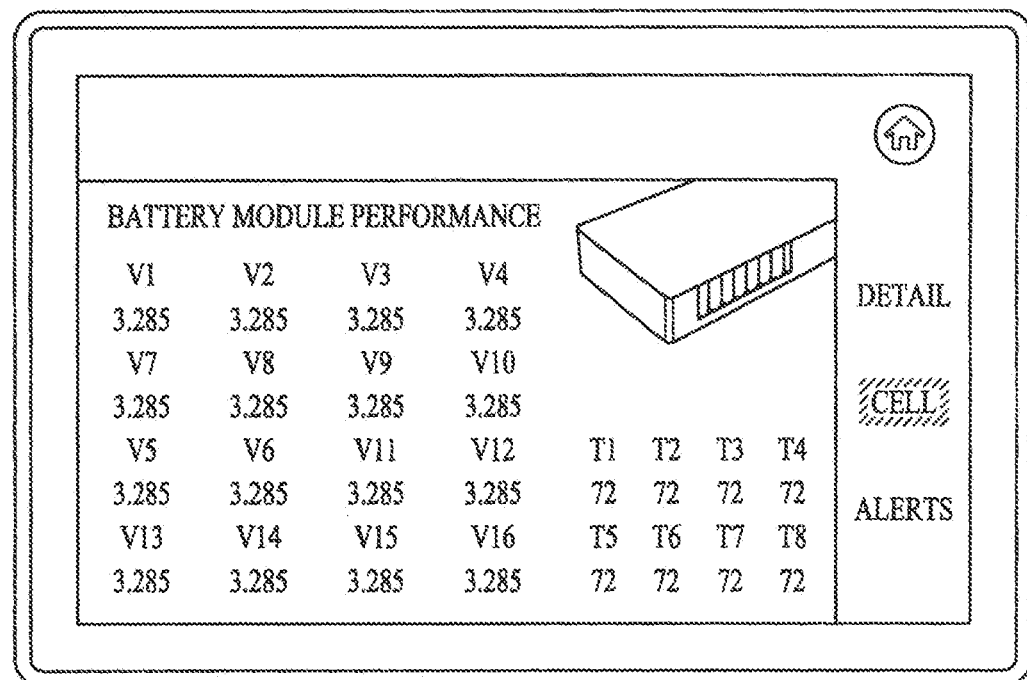
FIG. 16 shows a diagram of a screen of a battery management system of a transport vehicle, according to an aspect of this disclosure.

As shown in FIG. 16, an embodiment of the screen control unit 200 may also provide information regarding the battery module performance, showing information and values relating to the performance of each cell.

Figure 17:
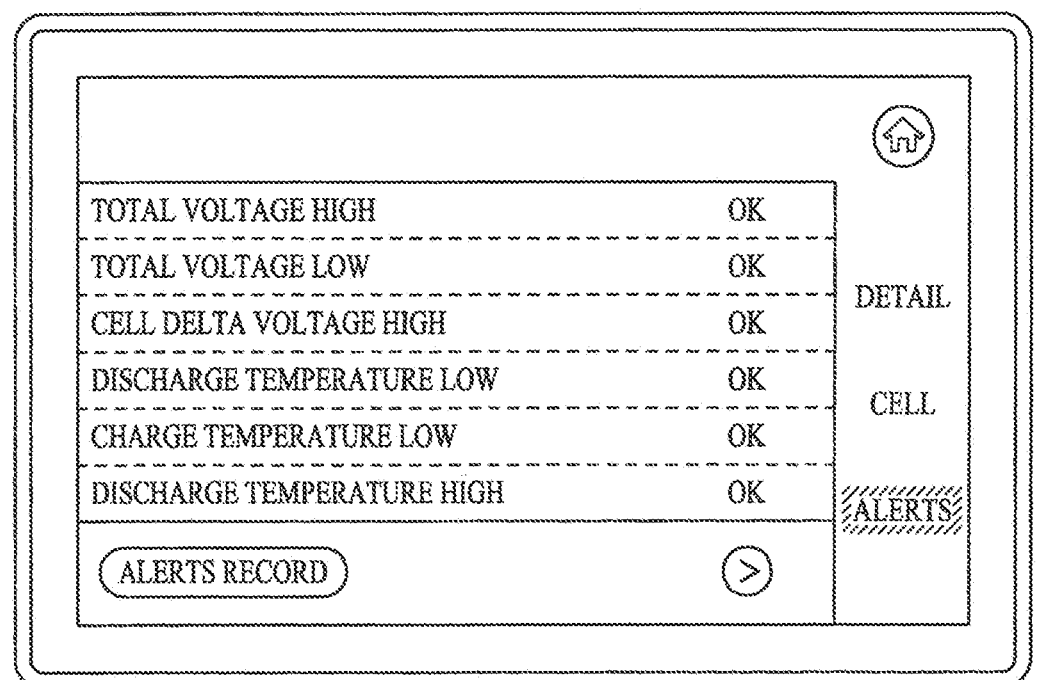
FIG. 17 shows a diagram of a screen of a battery management system of a transport vehicle, according to an aspect of this disclosure.
Figure 18:
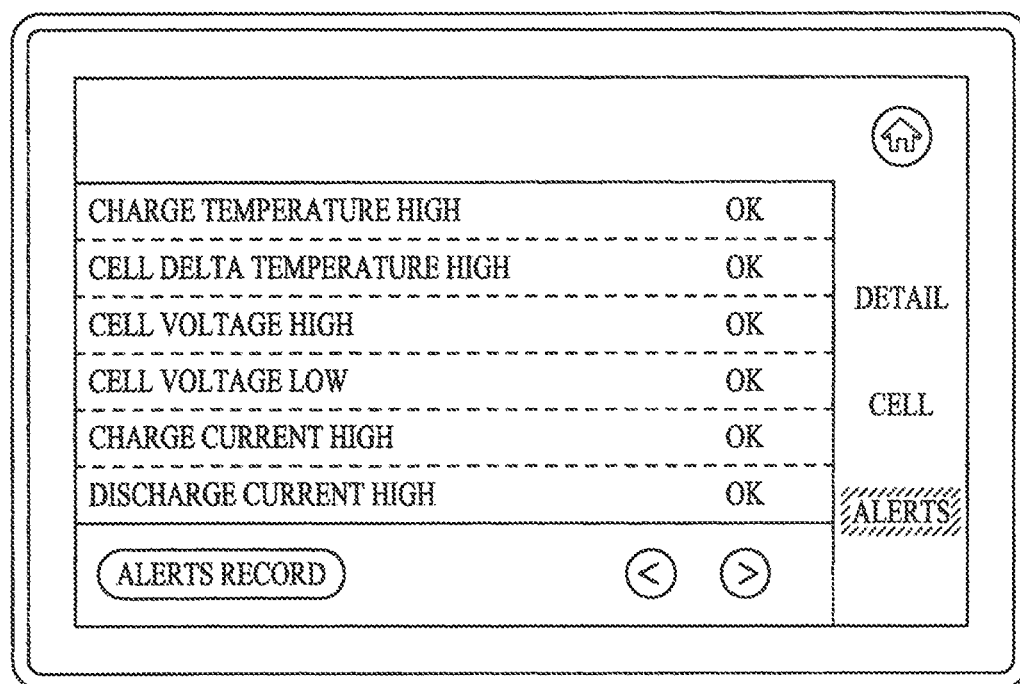
FIG. 18 shows a diagram of a screen of a battery management system of a transport vehicle, according to an aspect of this disclosure.

As shown in FIGS. 17 and 18, an embodiment of the screen control unit 200 may also provide information regarding battery system alerts, such as with respect to total voltage (high and/or low), cell delta voltage (high and/or low), charge temperature (high and/or low), discharge temperature (high and/or low), cell delta temperature (high and/or low), cell voltage (high and/or low), charge current (high and/or low), and discharge current (high and/or low).

Figure 19:
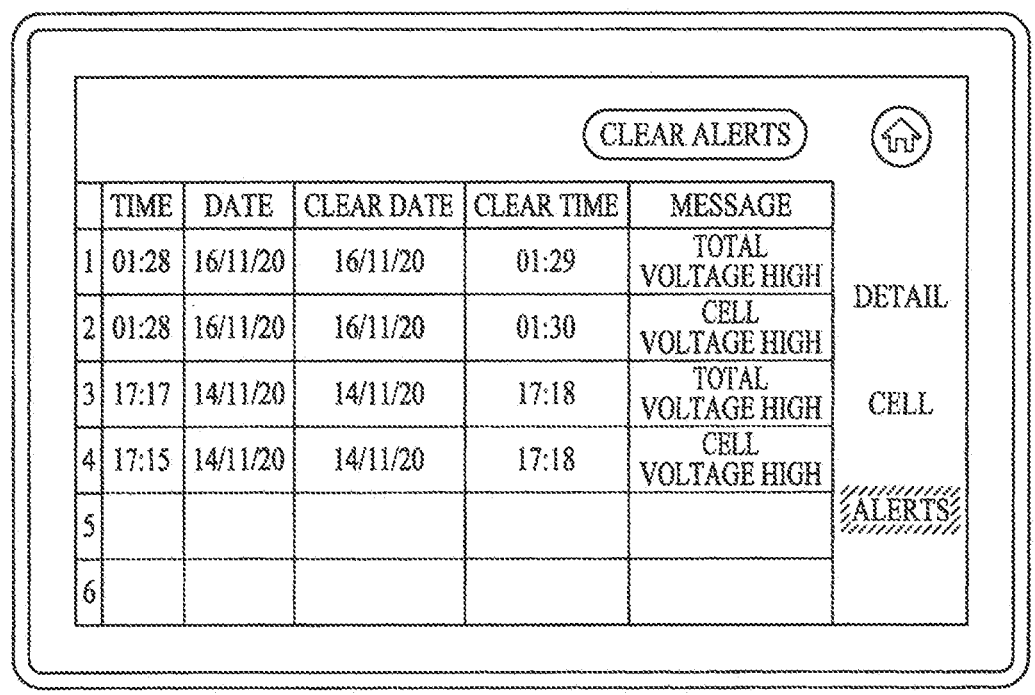
FIG. 19 shows a diagram of a screen of a battery management system of a transport vehicle, according to an aspect of this disclosure.

As shown in FIG. 19, an embodiment of the screen control unit 200 may also provide information regarding an alerts record history. The history may provide the date and time when the alert occurred, the type of alert that occurred, and the date and time the alert was cleared. There may also be an option to clear the alerts.

Figure 20:
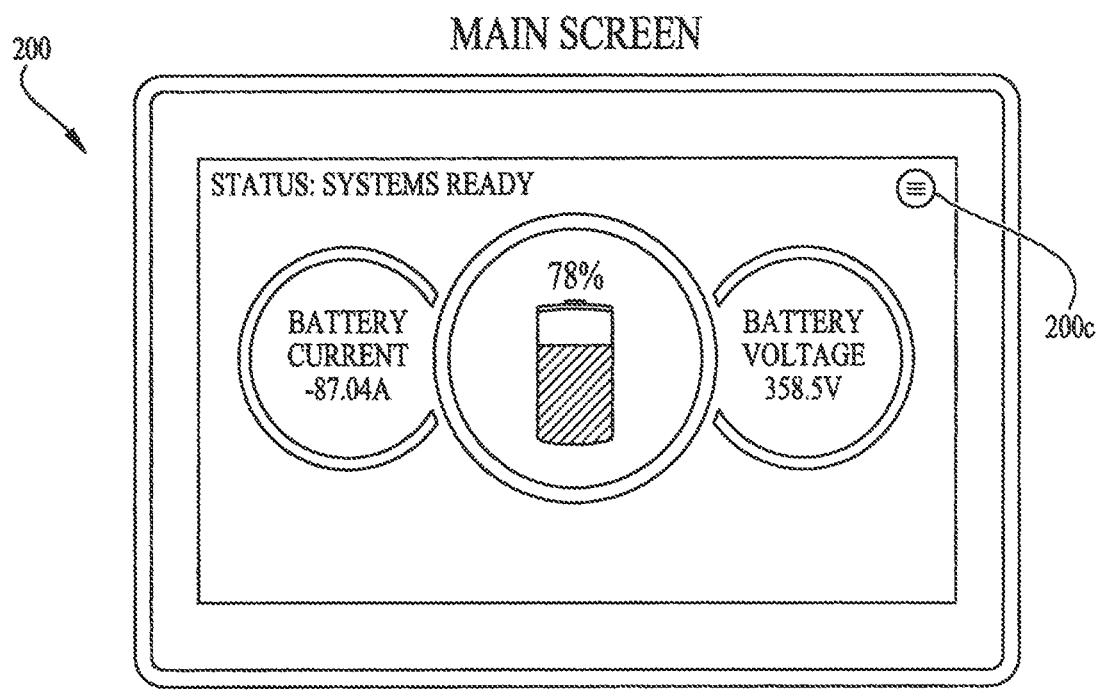
FIG. 20 shows a diagram of a screen of a battery management system of a transport vehicle, according to an aspect of this disclosure.

As shown in FIG. 20, an embodiment of the screen control unit 200 may generally have a main screen, which may appear upon turning on the screen. The screen may provide the status of the system, as well as information regarding the battery current, the battery percentage remaining, and the battery voltage.

Figure 21:
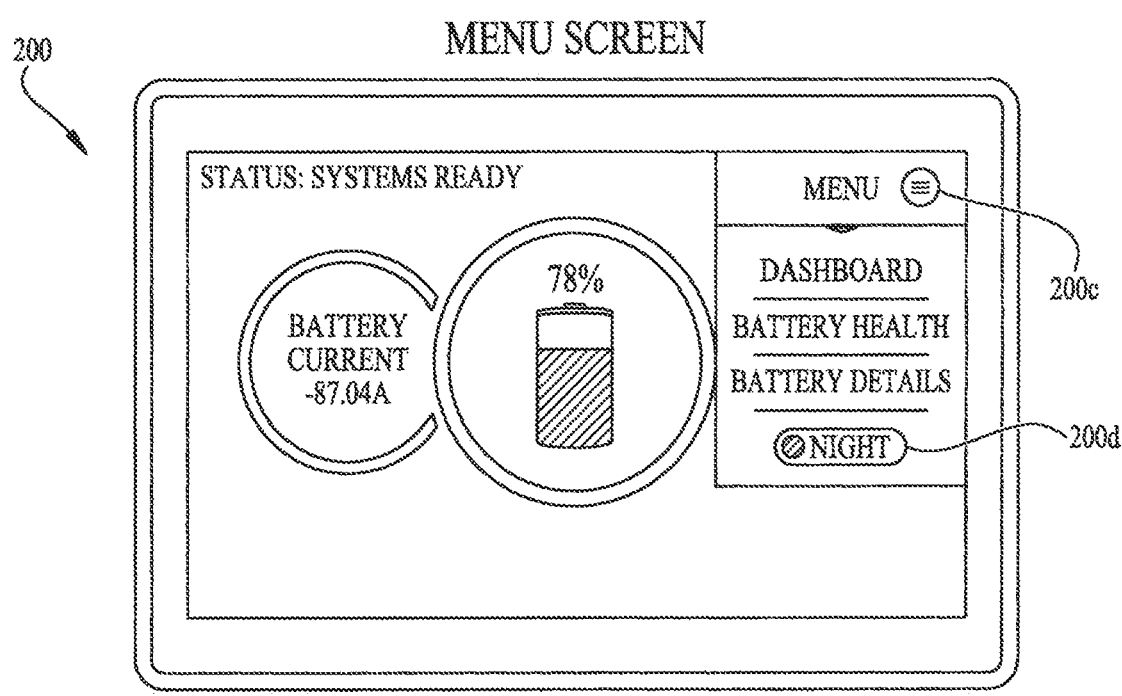
FIG. 21 shows a diagram of a screen of a battery management system of a transport vehicle, according to an aspect of this disclosure.

As shown in FIGS. 20 and 21, an embodiment of the screen control unit 200 may generally have a menu icon 200*c*, which may consist of three parallel horizontal lines (displayed as that contains a list of options of additional information regarding the system, such as dashboard, battery health, battery details. It may also contain a night icon 200*d* which dims the brightness and/or changes the contrast of the screen.

Figure 22:
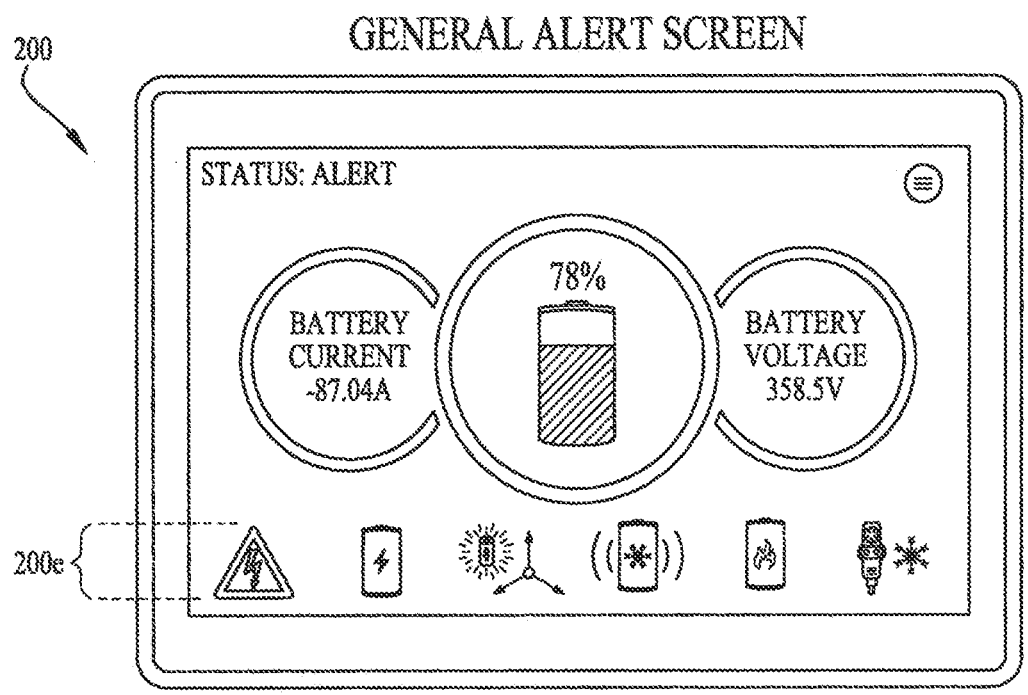
FIG. 22 shows a diagram of a screen of a battery management system of a transport vehicle, according to an aspect of this disclosure.

As shown in FIG. 22, an embodiment of the screen control unit 200 may generally have a general alert screen, wherein the status shows as the system having an alert, and wherein the screen shows various alert icons 200*e* (to the extent applicable depending on the alert), such as with respect to one or more of the following: total voltage (high and/or low), cell delta voltage (high and/or low), charge temperature (high and/or low), discharge temperature (high and/or low), cell delta temperature (high and/or low), cell voltage (high and/or low), charge current (high and/or low), and discharge current (high and/or low).

Figure 23:
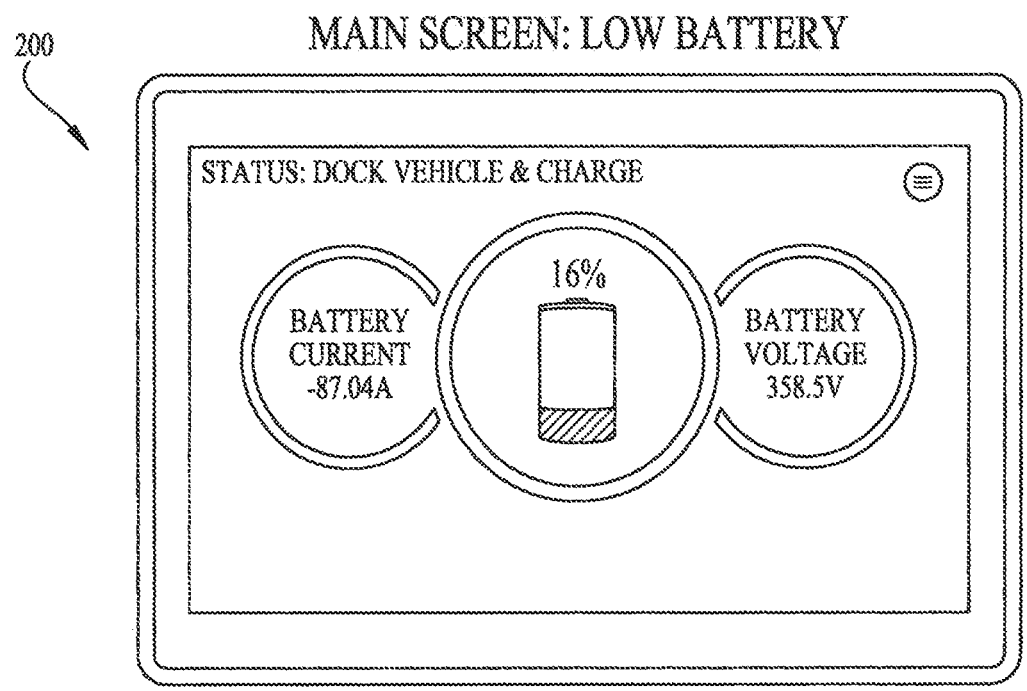
FIG. 23 shows a diagram of a screen of a battery management system of a transport vehicle, according to an aspect of this disclosure.

As shown in FIG. 23, an embodiment of the screen control unit 200 may generally have a low battery screen, wherein the status shows the system as needing the vehicle to be docked and the battery charged.

Figure 24:
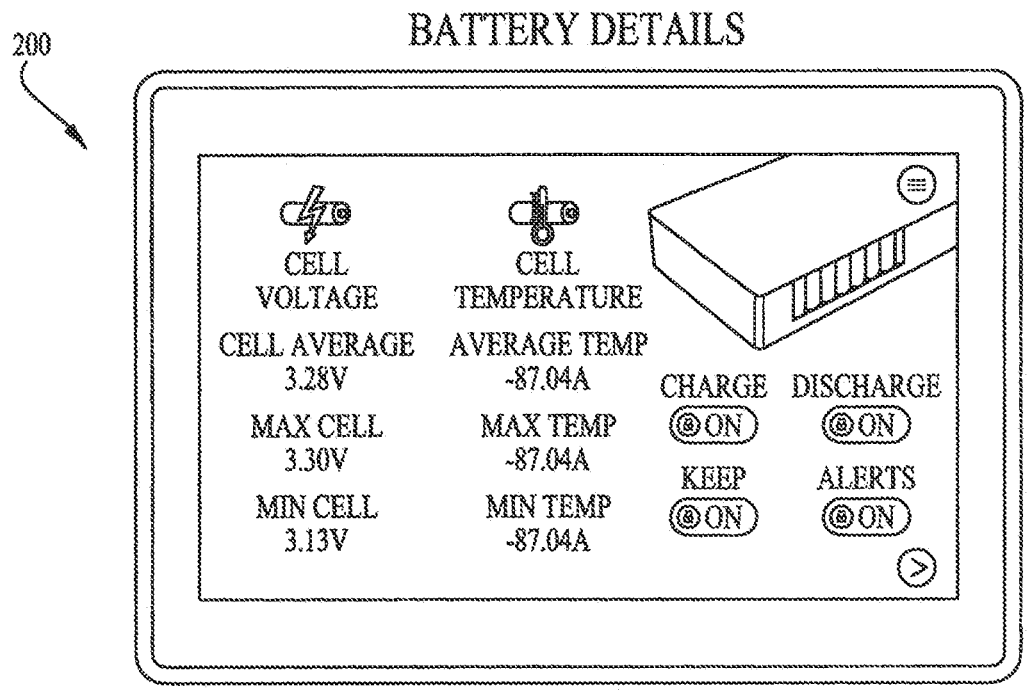
FIG. 24 shows a diagram of a screen of a battery management system of a transport vehicle, according to an aspect of this disclosure.

As shown in FIG. 24, an embodiment of the screen control unit 200 may generally have a battery details screen, containing information regarding cell voltage and cell temperature, including details regarding the cell voltage such as the average cell voltage, the maximum cell voltage, and the minimum cell voltage, and including details regarding the cell temperature such as the average cell temperature, the maximum cell temperature, and the minimum cell temperature. There are also toggle icons (allowing selection of on and off of the specified functionality or option) for charge, discharge, keep, and alerts.

Figure 25:
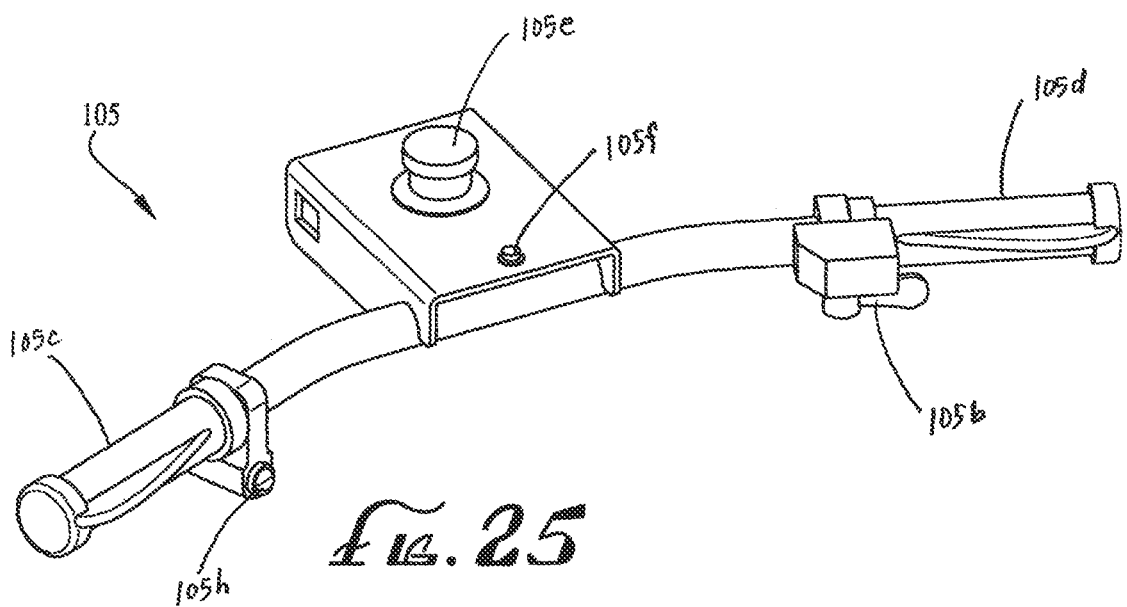
FIG. 25 shows a top plan view of a handle of a transport vehicle, according to an aspect of this disclosure.

FIG. 25 shows a handle 105 for the operator to use to operate, steer, and control the vehicle. When the vehicle is turned on, such as through an ignition or start key inserted into and turned while in a key switch 105*i* that may be located to the right of the handle 105 (see FIG. 13) (in other embodiments it may also be located on the handle itself), the vehicle, including its motor and controller, are activated for use. The operator then activates the battery management system through pressing the first "on" switch 200*a* and then a second "on" switch 200b to turn on the screen control unit 200. Both switches are shown in FIG. 13.

As shown in FIG. 25, the handle may have a drive acceleration lever 105b and a left handgrip 105c and a right handgrip 105d for vehicle steering. The drive acceleration lever 105b, when pushed forward by an operator (such as through his/her thumb(s)) will send a signal to the controller, which will then activate or engage the vehicle motor to propel the vehicle forward. To steer the vehicle left, the operator steers the handle towards the left, such as by pulling on the left handgrip 105c, and to steer the vehicle right, the operator steers the handle towards the right, such as by pulling on the right handgrip 105d. To stop, the operator simply releases the drive acceleration lever 105b. The handle 105 may also have an emergency stop button 105e, which when pushed, will send a signal to the controller, which will then activate or engage the vehicle brake, or stop the vehicle from moving forward. The handle may also have a horn button 105f that activates a horn when pushed into its on position. As shown in FIG. 13, the vehicle may also have a turtle or slow mode button 105g which slows down the vehicle speed when pushed into its on position. The handle may also have forward/reverse switch button 105h which, when switched to the forward mode, the vehicle will move in a forward direction when the acceleration lever is pressed or pushed, and when switched to the reverse mode, the vehicle will move in a reverse direction (i.e., backing up), when the acceleration lever is pressed or pushed.

Figure 26:
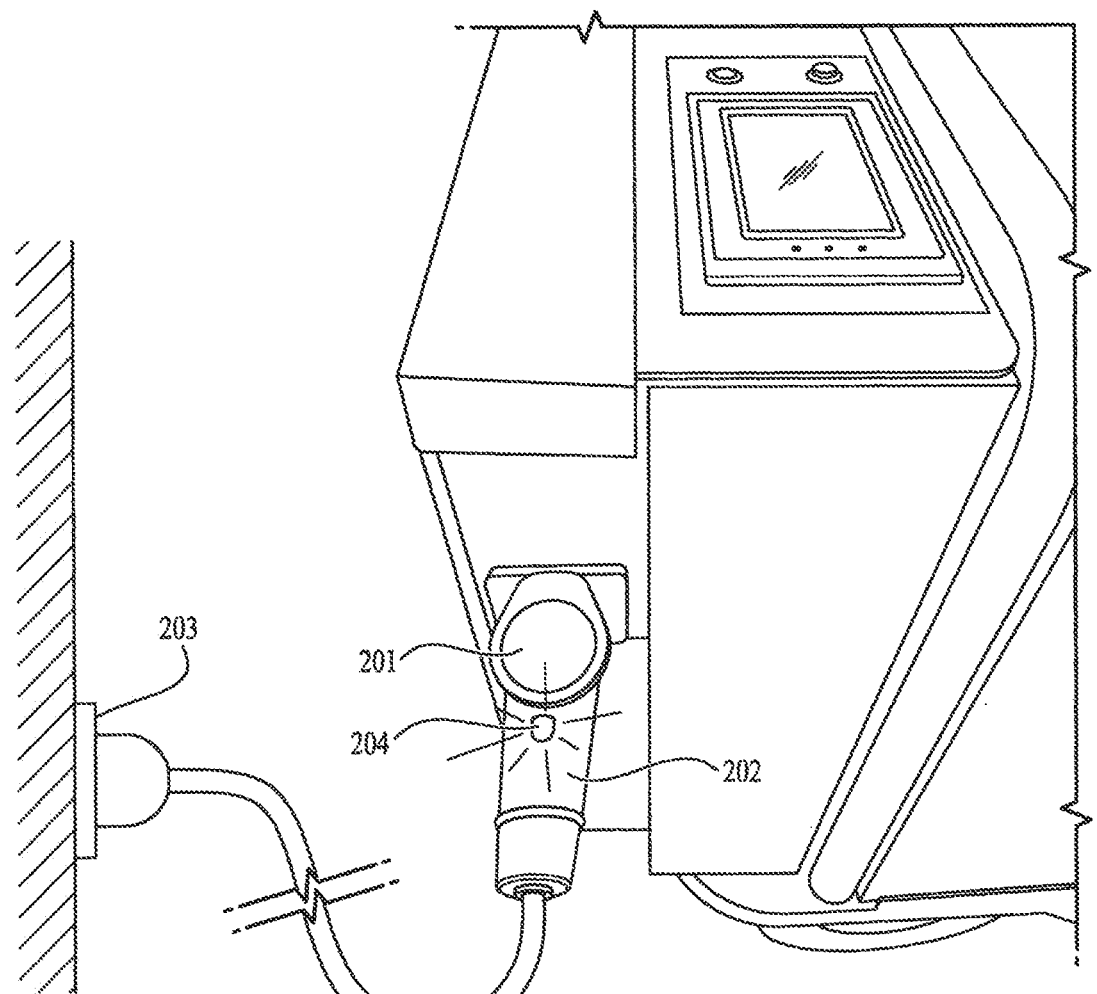
FIG. 26 shows a perspective view of a battery charger of a transport vehicle in a plugged-in, charging position, connected to a wall outlet, according to an aspect of this disclosure.
Figure 27:
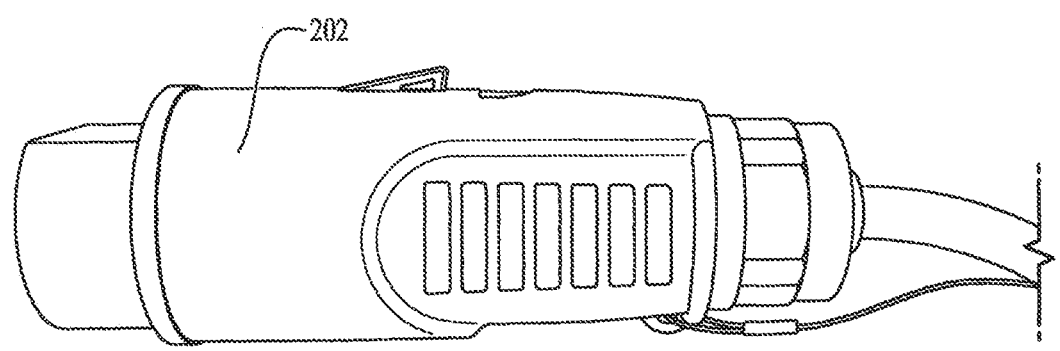
FIG. 27 is a perspective view of a battery charger of a transport vehicle, according to an aspect of this disclosure.
Figure 28:
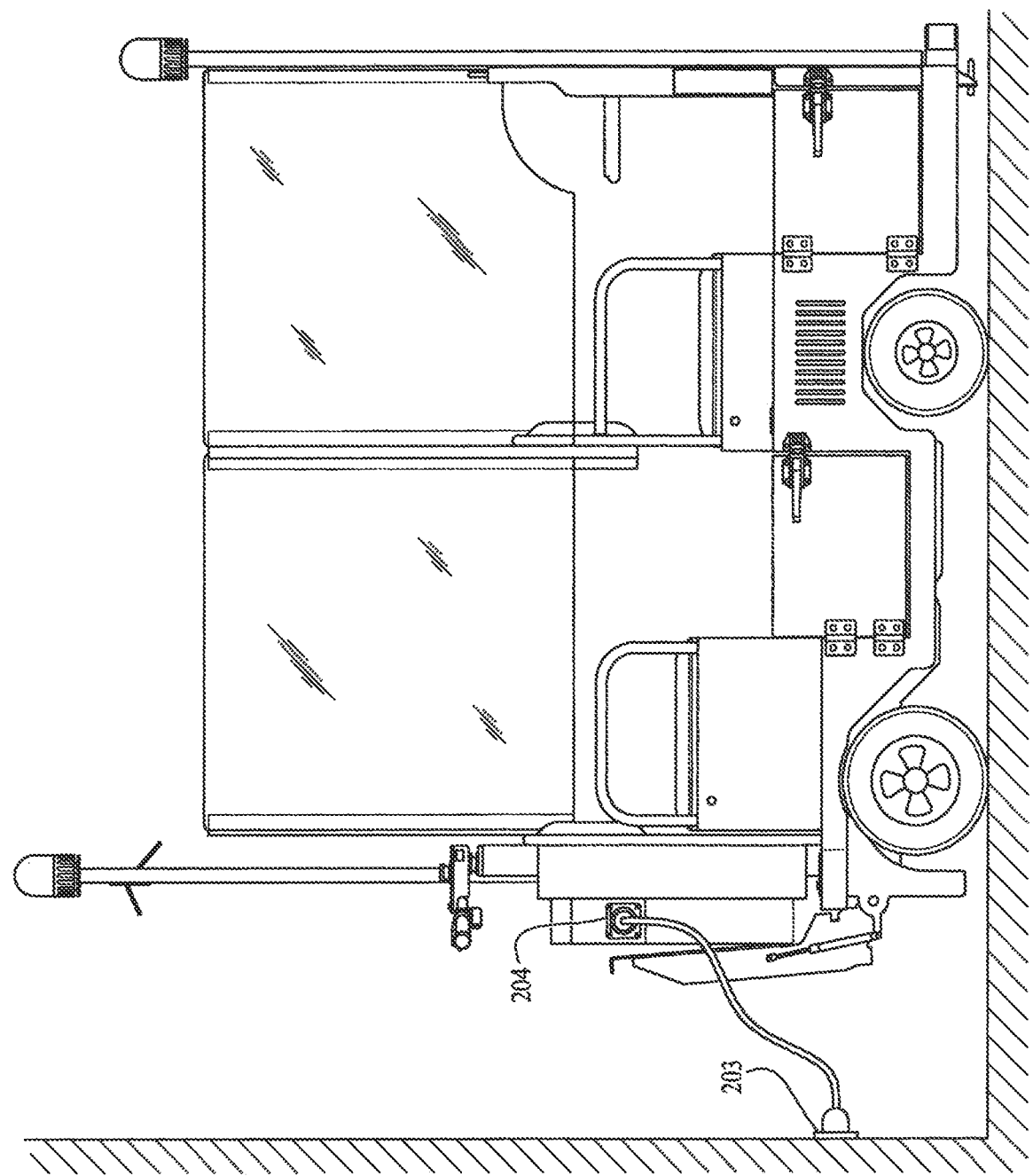
FIG. 28 is a side view of a transport vehicle while being charged, according to an aspect of this disclosure.

As shown in FIGS. 26, 27, and 28, an embodiment of a vehicle with the battery management system disclosed herein may be charged such as using any standard 110V (or 120V) outlet. A shown in FIGS. 26 and 28, the charger is plugged into a wall outlet 203, and then the charger head 202 is inserted into a charging socket on the vehicle. The LED light 204 will then indicate when the battery is being charged. For example, the LED light may blink red when the charger is in a charging state, and it may blink red-green when there is a fault or error (such as wrong voltage or if there is a temperature or compatibility issue). The charging time using a regular wall outlet is about 9-10 hours with a state of charge (SOC) from 15% to 100%. The run time is approximately 8-10 hours on a full charge, with 4 passengers and 1 operator or driver.

In other embodiments, the vehicle and its battery management system may be configured use faster charging systems such as those known in the field as Level 2 or Level 3 which reduce the charging time from 9 to 10 hours to 1 to 3 hours. Level 2 chargers are typically 220-240 V which typically charge at a rate of about 6 kilowatts. Level 3 chargers which are sometimes referred to as fast chargers, DCFC chargers, and DC fast chargers. They are 400 V or more, and typically charge at a rate of 50-60 kW.

Figure 29:
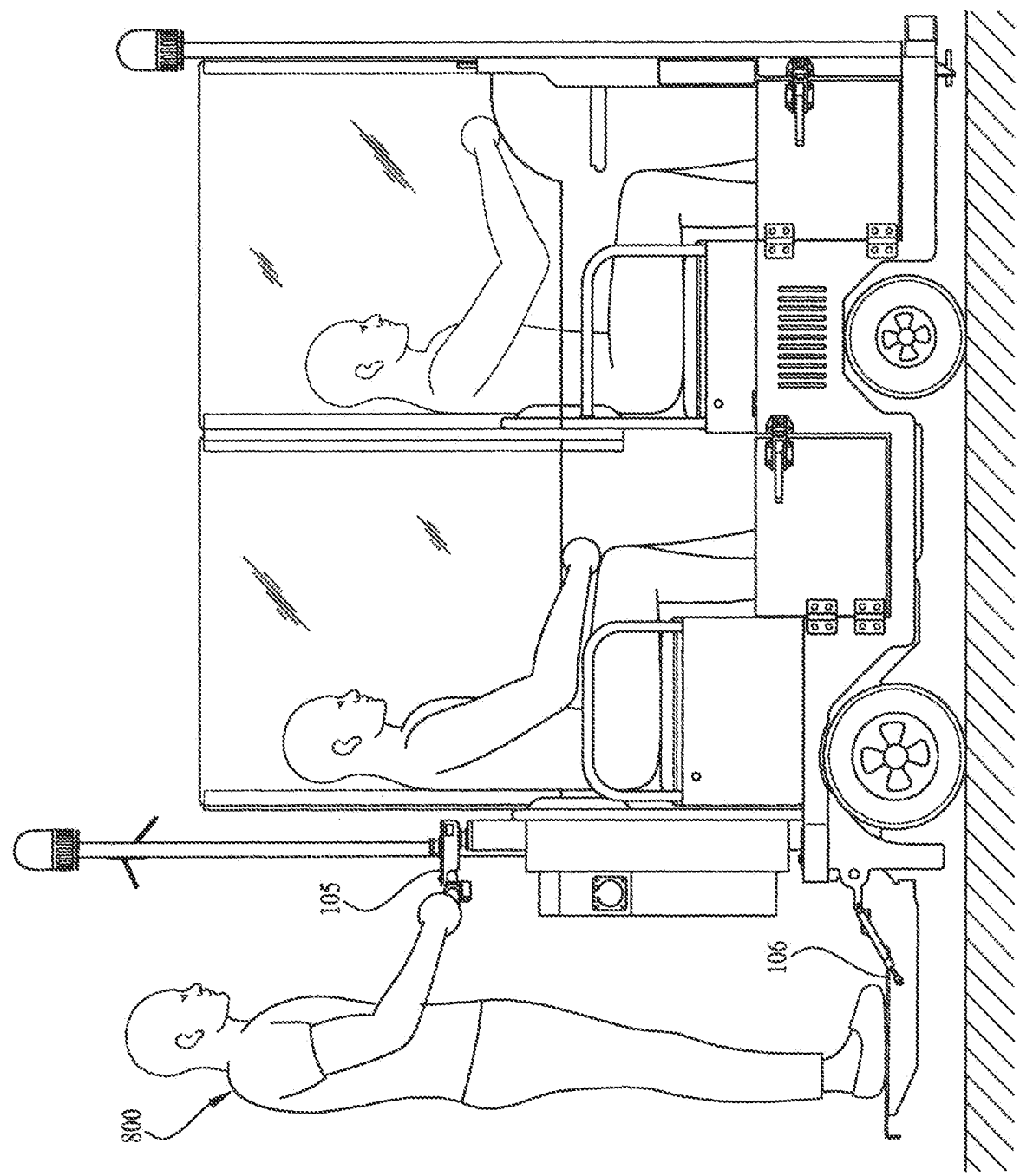
FIG. 29 is a side view of a transport vehicle while in use, according to an aspect of this disclosure.

As shown in FIGS. 29, during operation of the vehicle, the operator 800 may stand on the foot board 106 in its open position as shown, or the operator 800 may also operate the vehicle with the foot board 106 is in its closed or upright position (as shown in FIG. 13), walking with the vehicle while the vehicle propels or moves forward. The vehicle may be operated as described with reference to FIG. 25 above. The vehicle speed may vary, but in an airport terminal setting, the maximum speed may be set within the controller to about 3-4 miles per hour. The speeds are typically reduced (such as by using the slow or turtle mode switch) in hills or inclines or declines, blind corners, intersections, around airport terminal passengers and departure gates, restrooms, security checkpoints, restaurants and shops, security bypass doors, and any other area where there is heavy foot traffic.

FIG. 30 shows an embodiment of a vehicle in operation, with an operator 800 on board, entering an elevator 900. The vehicle size and dimensions are configured to fit through and fully occupy elevators, such as airport elevators. In a typical airport terminal setting (such as in the Los Angeles International Airport terminal), the gate elevator sizes range from 60 inches×99½ inches×77 inches; 60 inches×56 inches×93½ inches; 60 inches×54 inches×91 inches; 60 inches×53 inches×91 inches; 60 inches×69½ inches×116 inches; 61 inches×102 inches×77 inches; 61 inches×104 inches×78 inches. An embodiment of a vehicle as disclosed herein may be configured to fit through one or more (or all of) such elevators.

This written description uses examples to disclose the invention, including the best mode, and also to enable any person skilled in the art to practice the invention, including making and using any devices or systems and performing any incorporated methods. Although specific embodiments of the invention have been described, various modifications, alterations, alternative constructions, and equivalents are also encompassed within the scope of the invention.

Having thus described the various embodiments, it is to be appreciated and will be apparent to those skilled in the art that the present embodiments are to be considered in all respects as illustrative and not restrictive. Although features and elements are described above in particular combinations, it is to be appreciated that each feature or element can be used alone or in any combination or sub-combination with or without the other features and elements. Any single embodiment described herein can be supplemented with one or more elements from any one or more of the other embodiments described herein. Any single element of an embodiment can be replaced with one or more elements from any one or more of the other embodiments described herein.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A transport vehicle for transporting at least four passengers through an airport, the vehicle comprising:
   a body;
   a front passenger seat, disposed in the body, said front passenger seat dimensioned to seat two adults thereon;
   a rear passenger seat, disposed in the body, said rear passenger seat dimensioned to seat two adults thereon;
   an operator area, for supporting an operator of the vehicle thereon, disposed on the body, the rear passenger seat being disposed between the front passenger seat and the operator area; a distance from a front of the body to a rear of the operator area being less than a depth of an airport elevator, and a width of the body being less than a width of an airport elevator door; and
   a front collision sensor disposed on a front of the body.

2. The transport vehicle of claim 1, further comprising a side collision sensor disposed on a side of the body.

3. The transport vehicle of claim 1, wherein the front collision sensor is formed of a shock absorbing material.

4. The transport vehicle of claim 1, further comprising a pole affixed to the body and extending above the body, and a light being affixed to the pole at a position away from the body.

5. The transport vehicle of claim 1, further comprising a battery, the battery being disposed on the body, beneath at least one of the front passenger seat and the rear passenger seat.

6. The transport vehicle of claim 5, wherein the battery is Lithium iron battery.

7. The transport vehicle of claim 1, wherein the front passenger seat is dimensioned to seat at least two passengers; the rear passenger seat is dimensioned to seat at least two passengers; and further comprising a first partition window disposed along a longitudinal access of the body separating the at least two passengers of the front seat form the at least two passengers of the rear seat.

8. The transport vehicle of claim 7, further comprising a second partition traversing the first partition, and extending across the front passenger seat and the rear passenger seat.

9. The transport vehicle of claim 1, further comprising a foldable tray disposed on at least one of the body and a rear surface of the front passenger seat.

10. A transport vehicle for transporting at least four passengers through an airport, the vehicle comprising:
   a body;
   a front passenger seat, disposed in the body, said front passenger seat dimensioned to seat two adults thereon;
   a rear passenger seat, disposed in the body, said rear passenger seat dimensioned to seat two adults thereon;
   an operator area, for supporting an operator of the vehicle thereon, disposed on the body, the rear passenger seat being disposed between the front passenger seat and the operator area; a distance from a front of the body to a rear of the operator area being less than a depth of an airport elevator, and a width of the body being less than a width of an airport elevator door;
   further comprising a front collision sensor disposed on a front of the body; a controller, the front collision sensor being operatively coupled to a controller; and an emergency brake system for braking the vehicle; the controller receiving an input from the sensor when a pressure sensed by the sensor exceeds a predetermined value; and in response thereto, the controller outputting a signal to the emergency braking system to brake the vehicle.

11. A transport vehicle for transporting at least four passengers through an airport, the vehicle comprising:
   a body;
   a front passenger seat, disposed in the body, said front passenger seat dimensioned to seat two adults thereon;
   a rear passenger seat, disposed in the body, said rear passenger seat dimensioned to seat two adults thereon;
   an operator area, for supporting an operator of the vehicle thereon, disposed on the body, the rear passenger seat being disposed between the front passenger seat and the operator area; a distance from a front of the body to a rear of the operator area being less than a depth of an airport elevator, and a width of the body being less than a width of an airport elevator door, wherein the operator area comprises a steering handle, a controller operatively coupled to the steering wheel for controlling operation of the transport vehicle; and a collapsible foot board, the footboard moveable between a first position substantially against the body and a second position for supporting the operator.

12. A transport vehicle for transporting at least four passengers through an airport, the vehicle comprising:
   a body;
   a front passenger seat, disposed in the body, said front passenger seat dimensioned to seat two adults thereon;
   a rear passenger seat, disposed in the body, said rear passenger seat dimensioned to seat two adults thereon;
   an operator area, for supporting an operator of the vehicle thereon, disposed on the body, the rear passenger seat being disposed between the front passenger seat and the operator area; a distance from a front of the body to a rear of the operator area being less than a depth of an airport elevator, and a width of the body being less than a width of an airport elevator door;
   further comprising a pole affixed to the body and extending above the body, and a camera plate for supporting a camera thereon being affixed to the pole at a position away from the body.

13. The transport vehicle of claim 1, further comprising a battery; a controller, the controller having a screen, the control unit managing the battery at the screen, by monitoring one or more of a battery temperature, a battery charge, a fault diagnosis, a loose connection, a current, and an external vibration.

* * * * *